(12) United States Patent
Mohammad et al.

(10) Patent No.: US 11,418,533 B2
(45) Date of Patent: Aug. 16, 2022

(54) MULTI-TIERED SECURITY ANALYSIS METHOD AND SYSTEM

(71) Applicant: Prince Mohammad Bin Fahd University, Dhahran (SA)

(72) Inventors: Nazeeruddin Mohammad, Dhahran (SA); Shahabuddin Muhammad, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 253 days.

(21) Appl. No.: 16/853,067

(22) Filed: Apr. 20, 2020

(65) Prior Publication Data

US 2021/0329023 A1 Oct. 21, 2021

(51) Int. Cl.
*H04L 9/40* (2022.01)
*G06N 7/00* (2006.01)

(52) U.S. Cl.
CPC ......... *H04L 63/1433* (2013.01); *G06N 7/005* (2013.01); *H04L 63/1416* (2013.01); *H04L 63/1458* (2013.01); *H04L 63/1466* (2013.01)

(58) Field of Classification Search
CPC ............. H04L 63/1433; H04L 63/1416; H04L 63/1458; H04L 63/1466; G06N 7/005
See application file for complete search history.

(56) References Cited

U.S. PATENT DOCUMENTS 10,848,515 B1 * 11/2020 Pokhrel ............... H04L 63/1416
11,050,770 B2 * 6/2021 Nanda ................ H04L 63/1433
(Continued)

FOREIGN PATENT DOCUMENTS

| CN | 107135224 A | * | 9/2017 |
| CN | 107770168 A | | 3/2018 |
| KR | 10-0707941 B1 | | 4/2007 |

OTHER PUBLICATIONS

Nazeeruddin Mohammad, et al., "A Multi-Tiered Defense Model for the Security Analysis of Critical Facilities in Smart Cities", IEEE Access, Special Section on Security, Privacy, and Trust Management in Smart Cities, vol. 7, Oct. 15, 2019, pp. 152585-152598.

(Continued)

*Primary Examiner* — Joseph P Hirl
*Assistant Examiner* — Stephen T Gundry
(74) *Attorney, Agent, or Firm* — Oblon, McClelland, Maier & Neustadt, L.L.P.

(57) ABSTRACT

Methods, systems, and computer readable media for providing computer security analysis are described. In some implementations, a system providing computer security analysis comprises one or more processors coupled to a non-transitory computer readable storage having software instructions stored thereon configured to cause the one or more processors to: perform a Markov Decision Process (MDP) as part of a cyber-attack mechanism and a Discrete Time Markov Chain (DTMC) process as part of a cyber-defense mechanism, preferably, the cyber-attack and cyber-defense system is modeled as MDP whereas the security analyst SA is modeled as DTMC; synchronize the cyber-attack mechanism with the cyber-defense mechanism through an attack-defense synchronization action; and synchronize an update action, wherein the attack-defense synchronization action includes initiating the DTMC process, and wherein the synchronization of the update action results from one or more actions taken by the DTMC process.

14 Claims, 19 Drawing Sheets

(56) References Cited

U.S. PATENT DOCUMENTS

| | | | |
|---|---|---|---|
| 11,057,409 B1* | 7/2021 | Bisht | H04L 41/12 |
| 11,184,385 B2* | 11/2021 | Hadar | H04L 63/1416 |
| 11,194,905 B2* | 12/2021 | Sanchez | G06F 21/554 |
| 2014/0041032 A1* | 2/2014 | Scheper | H04L 63/1425 |
| | | | 726/23 |
| 2017/0364831 A1* | 12/2017 | Ghosh | G06F 11/30 |
| 2018/0262519 A1 | 9/2018 | Arunkumar et al. | |
| 2020/0045069 A1* | 2/2020 | Nanda | G06N 5/046 |
| 2020/0267171 A1* | 8/2020 | Mozumdar | G06F 13/4282 |
| 2020/0327223 A1* | 10/2020 | Sanchez | G06F 21/554 |
| 2020/0351298 A1* | 11/2020 | Paturi | G06N 5/04 |
| 2021/0194915 A1* | 6/2021 | Duo | H04L 63/1416 |
| 2021/0211438 A1* | 7/2021 | Trim | G06N 3/088 |
| 2021/0248240 A1* | 8/2021 | Comish | G06F 21/577 |
| 2021/0258329 A1* | 8/2021 | Clayton | H04L 63/0815 |
| 2021/0273950 A1* | 9/2021 | Lawson | G06K 9/6256 |
| 2021/0273960 A1* | 9/2021 | Humphrey | G06F 21/577 |
| 2021/0273961 A1* | 9/2021 | Humphrey | H04L 63/105 |
| 2021/0273967 A1* | 9/2021 | Vela | H04L 63/1466 |
| 2022/0035927 A1* | 2/2022 | Lysecky | H04L 63/1416 |

OTHER PUBLICATIONS

Abul Bashar, et al., "Modeling and Analysis of MDP-based Security Risk Assessment System for Smart Grids", The 4$^{th}$ International Conference on Inventive Systems and Control (ICISC 2020), Jan. 8-10, 2020, 6 pages.

Nazeeruddin Mohammad, et al., "Formal Analysis of Human-Assisted Smart City Emergency Services", IEEE Access, vol. 7, Apr. 29, 2019, pp. 60376-60388.

\* cited by examiner

MULTI-TIERED SECURITY ANALYSIS METHOD AND SYSTEM

PRIOR DISCLOSURE BY AN INVENTOR

Aspects of the present disclosure were described in "A Multi-Tiered Defense Model for the Security Analysis of Critical Facilities in Smart Cities," by Nazeeruddin Mohammad on Oct. 15, 2019 in IEEE Access Vol. 7, 2019, and "Modeling and Analysis of MDP-based Security Risk Assessment System for Smart Grids," presented by Nazeeruddin Mohammad et al. at the 4th International Conference on Inventive Systems and Control (ICISC 2020), January 8-10, 2020, incorporated herein by reference entireties its entirety.

BACKGROUND

Technical Field

The present disclosure is directed generally to computer security and, more particularly, to methods, computer readable media, and systems to provide multi-tiered computer security analysis.

Description of the Related Art

Cybersecurity includes the confluence of practices, technology, and people to ensure the protection of individuals, organizations, networks, data, programs, and devices from disruption, attacks, damage, or unauthorized access. Cybersecurity can include, for example, the state or process for defending and protecting networks, computers, and data from malicious attacks, e.g., cyber/digital attacks.

Cybersecurity is an important precondition for the successful operation of governmental, industrial, and private infrastructure, processes, and services. Given the complexities of real-time systems and networks as well as the complexity of interactions between the various components of such networks and systems, proper assessment of the overall security of a system or network throughout the life cycle of the corresponding system or network and/or during the lifecycle of services or data provided by such networks or systems is a complex and challenging endeavor.

Conventional cybersecurity systems may not always defend against the attacks. Some implementations of the present disclosure were conceived in light of the above-mentioned problems and limitations of conventional cybersecurity techniques, methods and tools.

Accordingly, the present disclosure provides systems and methods for analysis of security deployments based on multiple tiers of defense, where the tiers can include defense at a component level, a system level, and/or a security operations center level. For a given system configuration or component vulnerability vector, the disclosed systems and methods provide an assessment of security parameters for a variety of attacks.

SUMMARY

Some implementations include a system that provides computer security analysis. In some implementations, the system comprises one or more processors coupled to a non-transitory computer readable storage having software instructions stored thereon configured to cause the one or more processors to: perform a Markov Decision Process (MDP) as part of a cyber-attack mechanism and a Discrete Time Markov Chain (DTMC) process as part of a cyber-defense mechanism; synchronize the cyber-attack mechanism with the cyber-defense mechanism through an attack-defense synchronization action; and synchronize an update action, wherein the attack-defense synchronization action includes initiating the DTMC process, and wherein the synchronization of the update action results from one or more actions taken by the DTMC process.

In some implementations, the Markov Decision Process (MDP) for the cyber-attack mechanism comprises: in a first state, selecting, non-deterministically, a particular type of attack; in a second state, selecting a component device; in a third state, determining one of the component device being successfully attacked by the particular type of attack with a probability $p^{ij}$ or the cyber-defense mechanism thwarting the particular type of attack with a probability $(1-p^{ij})$; and when the component device is successfully attacked, raising a security alert. In some implementations, when a third tier of defense fails to protect the component device, changing a status of the component device to compromised. In some implementations, the DTMC process probabilistically raises a defense level of the system in response to one or more of a workload level reaching a workload threshold or a fatigue level reaching a fatigue threshold.

In some implementations, the system further comprises: a configuration unit to identify components and relationships among components in a cyber physical system operating under a control of a security operations center; and a vulnerability unit to identify vulnerabilities of one or more of each of the components or each of one or more communication protocols of the cyber physical system.

In some implementations, the system further comprises: an attack unit that provides attack models, wherein the attack models include one or more of a denial of service (DoS) attack model, an eavesdropping (Man in the Middle) attack model, a replay attack model, a data modification attack model, a masquerade attack model, or a blind attack model; a defense unit that provides defense models, wherein the defense models include one or more of a firewall defense model, an intrusion detection system (IDS) defense model, a proxy defense model, a security operations center (SOC) analyst model, or an anti-malware defense model; and a probabilistic model that operates the MDP for a selected attack model in parallel with the DTMC process for a selected defense model, wherein the probabilistic model predicts one or more of a probability of occurrence a security attack, a cost of the security attack, or a time of occurrence of the security attack. In some implementations, the defense unit includes at least a first defense model at a component level, a second defense model at a system level, and a third defense model at a security operation center level. In one embodiment the cyber-attack and cyber-defense systems are modeled as MDP, whereas the SOC security analyst (SA) is modelled as DTMC.

Some implementations include a method that provides computer security analysis. In some implementations, the method comprises: performing, using one or more processors, a Markov Decision Process (MDP) as part of a cyber-attack mechanism and a Discrete Time Markov Chain (DTMC) process as part of a cyber-defense mechanism; synchronizing, using the one or more processors, the cyber-attack mechanism with the cyber-defense mechanism through an attack-defense synchronization action; and synchronizing an update action, using the one or more processors, wherein the attack-defense synchronization action includes initiating the DTMC process, and wherein the synchronization of the update action results from one or more actions taken by the DTMC process.

In some implementations, the Markov Decision Process (MDP) for the cyber-attack mechanism comprises: in a first state, selecting, non-deterministically, a particular type of attack; in a second state, selecting a component device; in a third state, determining one of the component device being successfully attacked by the particular type of attack with a probability $p^{ij}$ or the cyber-defense mechanism thwarting the particular type of attack with a probability $(1-p^{ij})$; and when the component device is successfully attacked, raising a security alert. In some implementations, when a third tier of defense fails to protect the component device, changing a status of the component device to compromised. In some implementations, the DTMC process probabilistically raises a defense level of the system in response to one or more of a workload level reaching a workload threshold or a fatigue level reaching a fatigue threshold.

In some implementations, the method further comprises: identifying, using the one or more processors, components and relationships among components in a cyber physical system operating under a control of a security operations center; and identifying, using the one or more processors, vulnerabilities of one or more of each of the components or each of one or more communication protocols of the cyber physical system. In some implementations, the method further comprises: operating, through a probabilistic model, using the one or more processors, the MDP for a selected attack model in parallel with the DTMC process for a selected defense model, wherein the probabilistic model predicts one or more of a probability of occurrence a security attack, a cost of the security attack, or a time of occurrence of the security attack, wherein the selected attack model is selected from one or more attack models including one or more of a denial of service (DoS) attack model, an eavesdropping (Man in the Middle) attack model, a replay attack model, a data modification attack model, a masquerade attack model, or a blind attack model, wherein the selected defense model is selected from one or more defense models including one or more of a firewall defense model, an intrusion detection system (IDS) defense model, a proxy defense model, an analyst model, or an anti-malware defense model. In some implementations, the one or more defense models include at least a first defense model at a component level, a second defense model at a system level, and a third defense model at a security operation center level.

Some implementations include a non-transitory computer readable medium having instructions stored therein that, when executed by one or more processors, cause the one or more processors to perform a method to provide computer security analysis. In some implementations, the method comprises: performing, using the one or more processors, a Markov Decision Process (MDP) as part of a cyber-attack mechanism and a Discrete Time Markov Chain (DTMC) process as part of a cyber-defense mechanism; synchronizing, using the one or more processors, the cyber-attack mechanism with the cyber-defense mechanism through an attack-defense synchronization action; and synchronizing an update action using the one or more processors, wherein the attack-defense synchronization action includes initiating the DTMC process, and wherein the synchronization of the update action results from one or more actions taken by the DTMC process.

In some implementations, the Markov Decision Process (MDP) for the cyber-attack mechanism comprises: in a first state, selecting, non-deterministically, a particular type of attack; in a second state, selecting a component device; in a third state, determining one of the component device being successfully attacked by the particular type of attack with a probability $p^{ij}$ or the cyber-defense mechanism thwarting the particular type of attack with a probability $(1-p^{ij})$; and when the component device is successfully attacked, raising a security alert. In some implementations, when a third tier of defense fails to protect the component device, changing a status of the component device to compromised. In some implementations, the DTMC process probabilistically raises a defense level of the system in response to one or more of a workload level reaching a workload threshold or a fatigue level reaching a fatigue threshold.

In some implementations, the method further comprises: identifying, using the one or more processors, components and relationships among components in a cyber physical system operating under a control of a security operations center; and identifying, using the one or more processors, vulnerabilities of one or more of each of the components or each of one or more communication protocols of the cyber physical system. In some implementations, the method further comprises: operating, through a probabilistic model, using the one or more processors, the MDP for a selected attack model in parallel with the DTMC process for a selected defense model, wherein the probabilistic model predicts one or more of a probability of occurrence a security attack, a cost of the security attack, or a time of occurrence of the security attack.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
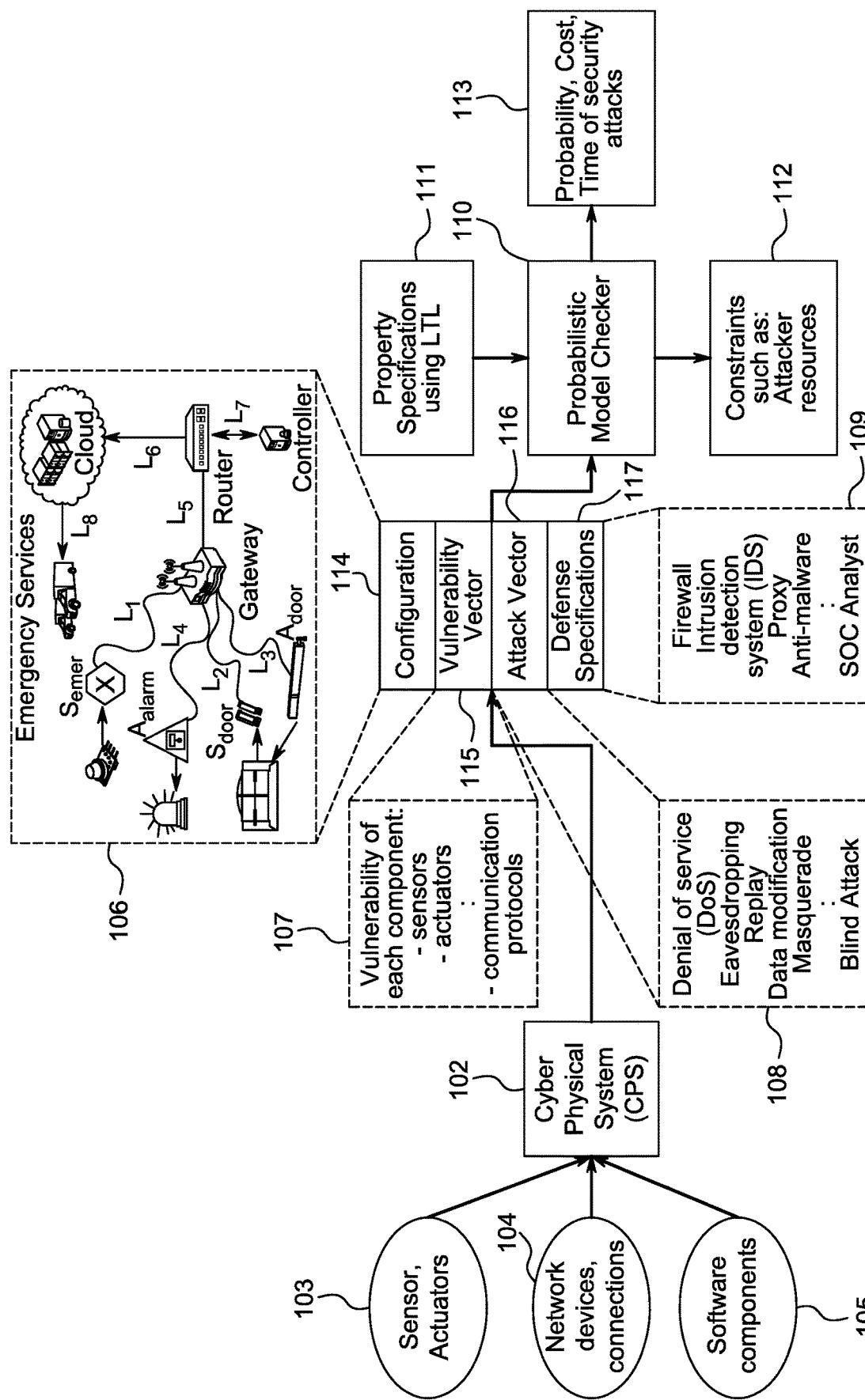
FIG. 1 is a diagram of an example system that provides computer security analysis in accordance with some implementations.

In the drawings, like reference numerals designate identical or corresponding parts throughout the several views. Further, as used herein, the words "a," "an," and the like generally carry a meaning of "one or more," unless stated otherwise. The drawings are generally drawn to scale unless specified otherwise or illustrating schematic structures or flowcharts.

In some implementations, the disclosed system/method models security of cyber systems at multiple levels of abstraction. In some implementations, to implement security deployments, the disclosed system/method is based on multiple tiers of defense, where the tiers include defense at a component level, a system level, and a security operations center level. For a given system configuration or component vulnerability vector, in some implementations, the disclosed system/method assesses security parameters for a variety of attacks. The system/method can be customized and applied to security models of cyber services, deployment configurations, and/or attack vectors. In some implementations, the disclosed system/method identifies and defends against both existing and hypothetical attacks by incorporating a variety of components used in a smart service. In some implementations, a model implemented by the disclosed system/method addresses various security events, for example, those arising in multi-system configurations.

In some implementations, the disclosed method provides calculation of the risk of system failure for a variety of vulnerability vectors. In some implementations, the disclosed method may generalize routine and trivial security implementation details of individual components and focus instead on risk analysis at a system/network level instead. In some implementations, the disclosed system/method provides the ability to capture and assess time-based system behavior using rich temporal operators in linear temporal logic (LTL). In some implementations, the disclosed system/method includes human-in-the-loop based defense layers that capture factors influencing human performance, such as fatigue and workload, by tracking levels of fatigue and/or workload. In some implementations, the disclosed system/method raises a level of defense in response to a workload level reaching a workload threshold or a fatigue level reaching a fatigue threshold.

In some implementations, a disclosed method reduces time required to assess a system or network risk accurately without deployment of the method within the system or network. In some implementations, the disclosed system/method identifies security risks. The disclosed system/method improves productivity of security engineers in some implementations. In some implementations, the disclosed system/method identifies components that are not effective and need to be replaced. In some implementations, the disclosed system/method provides an ability to effectively use security budgets by identifying components/services with significant impact on reduction of security risk. The disclosed system/method can be used in any network/system that is vulnerable to cyberattacks. In some implementations, the disclosed system/method can design, analyze, and/or evaluate the security of cyber systems in one or more of the following domains.

Manufacturing industries, for example, oil and gas exploration/production systems Government services (e.g., citizen services using confidential citizen information)

Military and defense services, for example, internal and external threat screening Smart cities (e.g., waste management, energy management, emergency services)

Intelligent transport systems, for example, assisted/autonomous driving systems

Smart homes and workplaces (e.g., IoT, connected homes and connected offices)

Financial institutions and services, for example, trading of financial instruments In some implementations, the disclosed system/method analyzes cyber threats/attacks and takes appropriate countermeasures. As the cost of cybercrime is predicted to exceed $6 trillion by 2021, the disclosed system/method can be incorporated by organizations providing security services and security consultancy services to anticipate, identify, or defend against cyberattacks.

In some implementations, the disclosed system/method includes a model having three tiers of defense to provide security for a variety of system and/or network implementations. In some implementations, the first tier of defense includes component-level security, for example, authentication, encryption, etc. The defense at the first tier can be relatively weak if there are vulnerabilities at the component-level. In some implementations, in addition to the first tier of defense, there may be independent defense mechanisms that monitor services and take appropriate actions at a second tier. Examples of defenses at the second tier include anti-malware software for detecting any suspicious code and blocking such code, firewalls to monitor network traffic and block any suspicious activities, and/or intrusion detection and prevention systems (IDPS) for monitoring anomalies in the system/network. In some implementations, the third tier of defense is provided by a security operations center (SOC) that analyzes activities across the system around the clock.

In some implementations, the third tier of defense may be important to security as advances in attack tools and techniques are constantly reconfiguring the threat landscape. Also, some attacks may sneak through installed defenses (e.g., the first and/or second tier of defenses). In some of the implementations, the SOC, which may collect real-time activity data from all controllers, endpoints, and networks, diffuses attacks that sneak through other tiers of defense. In some implementations, an expert and/or vigilant SOC team may leverage advanced data analytics, machine learning, and visualization techniques to identify and respond to any unfiltered attacks. In some of the implementations, cybersecurity analysts (SA) promptly and quickly respond to identified threats with proactive measures, which may significantly reduce the scope and degree to which a system/network/service is compromised. For example, an attack on transport services can be discovered once the attacker infects a computer and begins scanning for any critical data.

In some implementations, the threat detection process is a knowledge-intensive task in which a security analyst's expertise is leveraged to quickly/promptly eliminate false alerts and escalate any real alerts for further analysis/action. For example, the domain and/or situational knowledge of a security analyst can play a critical role in the decision process (i.e., process to decide whether a threat is real or is a false alert). Further, ability of a security analyst to relate different events and act in a timely manner can affect the response value and its effectiveness.

Another factor that may affect the response of an SOC is a security analyst's workload. In some implementations, defense at the third tier may incorporate parameters that can influence the performance of a security analyst, for example, based on the security analyst's fatigue/workload. In some implementations, the system/method raises/strengthens a level of defense in response to the workload level reaching a workload threshold or a fatigue level reaching a fatigue threshold.

In some implementations, the disclosed system/method has a two-pronged approach. First, the system/method provides design of a security center setup based on existing vulnerability scores. Second, the system/method instructs an existing security center setup to recalculate risks when new vulnerabilities are found. This dual approach provides the management an ability to identify cost-effective countermeasures to minimize security risk.

FIG. 1 is an exemplary schematic diagram of an example system for providing computer security analysis in accordance with some implementations. FIG. 1 shows an example cyber physical system (CPS) 102 that is connected to one or more sensors or actuators 103, network devices or connections 104, or software components 105. The cyber physical system 102 is also connected to a configuration unit 106, a vulnerability unit 107, an attack unit 108, and a defense unit 109. These are connected to a probabilistic model 110. The probabilistic model 110 is in turn connected to a specification unit 111 and a constraints unit 112 and outputs one or more of cost and/or time probabilities of security attacks 113 on the system/network being evaluated.

In some implementations, the configuration unit 106 identifies components as well as relationships among components in the cyber physical system 102 and generates a configuration 114 as an output. In some implementations, the cyber physical system 102 operates under the control of a security operations center. In some implementations, the vulnerability unit 107 identifies vulnerabilities of one or more of the components and/or vulnerabilities of one or more of the communication protocols of the cyber physical system 102 and generates a vulnerability vector 115 as an output. The components shown in FIG. 1 and described above (in the context of the operations of a vulnerability unit 107) include the one or more sensors or actuators in 103.

In some implementations, the attack unit 108 provides one or more attack models, wherein the attack models include one or more of a denial of service (DoS) attack model, a data modification attack model, a masquerade attack model, an eavesdropping ("Man in the Middle") attack model, a replay attack model, or a blind attack model. The attack unit 108 outputs an attack vector 116 in some implementations. In some implementations, the defense unit 109 provides one or more defense models, wherein the defense models include one or more of an intrusion detection system (IDS) defense model, a firewall defense model, an SOC (security operations center) analyst model, an anti-malware defense model, or a proxy defense model. In some of the implementations, the defense unit 109 outputs defense specifications 117. In some implementations, the probabilistic model 110 operates an MDP for a selected attack model in parallel with a DTMC process for a selected defense model. In some implementations, the probabilistic model 110 predicts one or more of a probability of a cost of a security attack, an occurrence of a security attack, or a time of occurrence of a security attack 113. The constraints unit 112 includes constraints such as an attacker's resources in some implementations. In some implementations, the specifications unit 111 includes property specifications (using an LTL).

Figure 2:
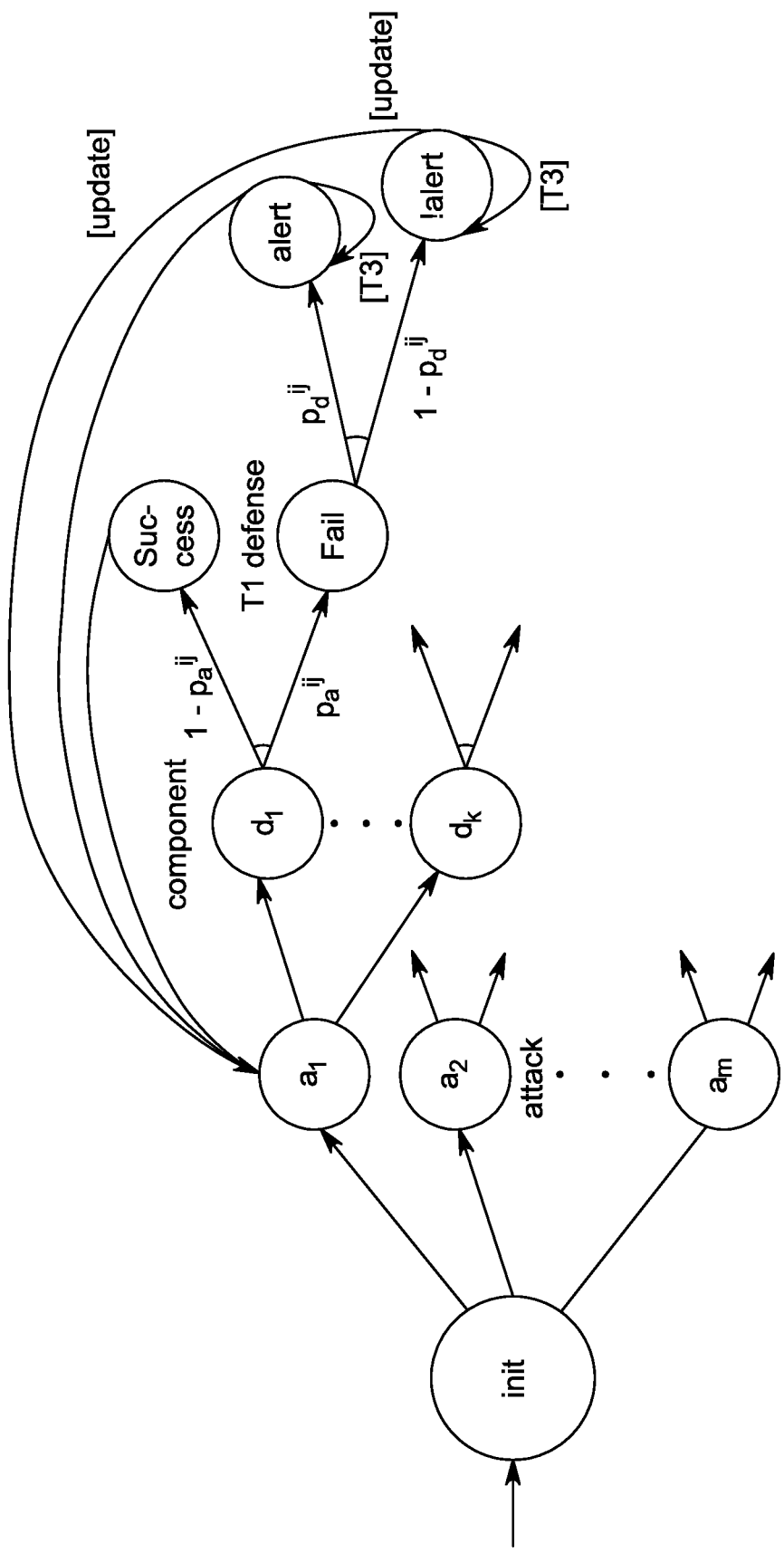
FIG. 2 is a state-transition diagram of an example attack-defense mechanism/process in accordance with some implementations.

In some implementations, due to non-deterministic choices inherent in an attacker's set of actions, the attack-defense mechanism/process can be modeled as a Markov Decision Process (MDP). FIG. 2 is a state-transition diagram of an example attack-defense mechanism/process in accordance with some implementations. FIG. 2 shows an MDP corresponding to an attack-defense mechanism/process of a system in some implementations. The model begins with an attacker non-deterministically selecting a particular type of attack from a list of attacks. This selection takes the model to the next state, where the attacker selects a device, which selection is also modeled non-deterministically in the MDP. In the next step, the attacker either attacks the device successfully with a probability of $p^{ij}$ and moves to the next state (e.g., a next tier/level of defense) or the system's defense mechanism/tier thwarts the attack. The steps are repeated until either one of the tiers of defense thwarts the attack or until the attack bypasses all three tiers of defense and successfully attacks the device. If the third tier of defense fails to protect a device from the attack, the device's status is changed to compromised. In some implementations, an alert is generated if a defense tier fails to thwart an attack. In some implementations, an alert is generated if all of the three defense tiers fail to thwart an attack and the device is compromised.

Figure 3:
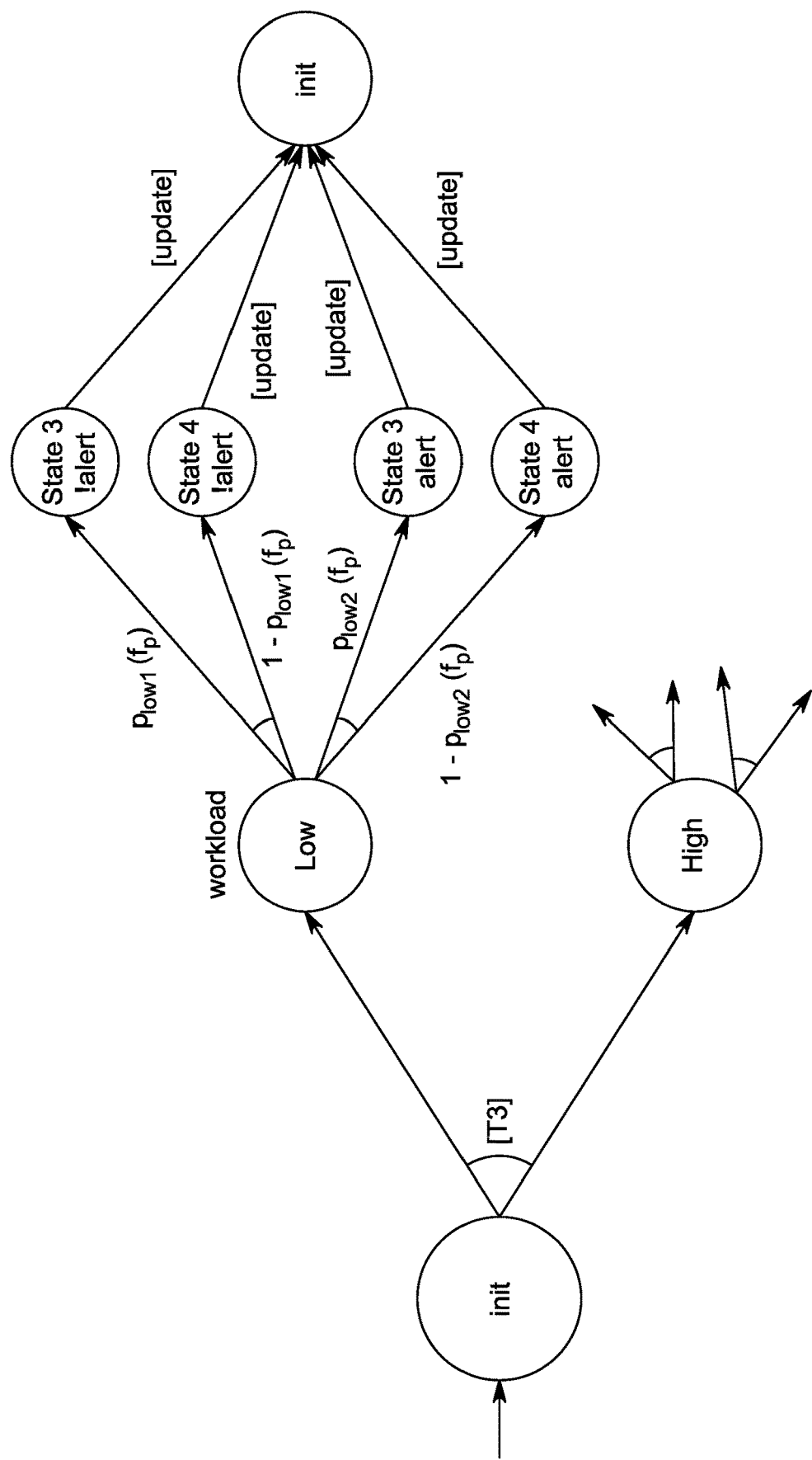
FIG. 3 is a state-transition diagram of an example security analyst mechanism/process in accordance with some implementations.

FIG. 3 is a state-transition diagram of an example security analyst process/mechanism in accordance with some implementations. In some implementations, the security analyst process/mechanism examines a system following a failure to thwart an attack by one or more defense tiers. In some implementations, due to a stochastic nature of a security analyst's set of actions, the security analyst mechanism/ process is modeled as a Discrete Time Markov Chain (DTMC) process. In some implementations, based on the workload and fatigue conditions, the DTMC process of the security analyst mechanism/process probabilistically raises the defense level of the system, thereby resulting in increased cost to the attacker to attack the system.

The disclosed system/method comprises an attack-defense mechanism/process module ($M_{AD}$) and a security analyst mechanism/process module ($M_{SA}$) in some implementations. In some of the implementations, $M_{AD}$ and $M_{SA}$ operate in parallel ($M_{AD}\|M_{SA}$), except during the synchronization of actions (shown by T3 in FIG. 3) of the attack-defense mechanism/process module and the security analyst mechanism/process module and/or when updating (shown by "update" in FIG. 3) the attack-defense mechanism/process module and/or the security analyst mechanism/process module following synchronization actions. The synchronizing action (T3) initiates the security analyst mechanism/process module to synchronize the attack-defense mechanism/process module with the security analyst mechanism/process module, whereas the synchronizing action "update" represents the result(s) of actions taken by the security analyst mechanism/process module in response to synchronization with the attack-defense module. In a preferred embodiment a first synchronization initiates the SA and, based on the output of SA, the system synchronizes and updates itself during a second synchronization.

The workings of the attack-defense mechanism/process module ($M_{AD}$) and the security analyst mechanism/process module in some of the implementations are shown in Algorithm 1 and Algorithm 2 respectively (shown below). An example algorithm (i.e., Algorithm 1) of an example attack-defense mechanism/process module ($M_{AD}$) is shown below.

Algorithm 1 The Attack-Defense Process

```
1:  procedure Attack-Defense
2:    Init: epoch ← 0, C ← ∅, alert ← false, I^ij ← 0
3:    Init: attacker's param: t_avail, T_cost, A, D
4:    Define: φ_i and Φ                    ▷ ref. Eq. 8, 9
5:    Init:   ∀i ∈ A, j ∈ D: p_a^ij, p_d^ij  ▷ ref. Table 1
6:    while true do              Continuously run for
                                  all epochs
7:      select i ∈ A             ▷ non-deterministic
                                  selection
8:      select j ∈ D_i, (D_i ⊆ D ∧ j ∉ C)
9:                               ▷ non-deterministic
                                  selection
10:     n^ij ← n^ij + 1
11:     select state ← 1 with prob. p_a^ij
12:            ← 2 with prob. (1 − p_a^ij)
13:     if state = 2, then go to 8
14:     alert ← true with prob. p_d^ij
15:     C = C ∪ j with prob. (1 − p_d^ij)
16:     sync action [T3]   ▷ synchronize with SA module
17:     alert ← false        ▷ reset this variable
18:     if state_SA = 3 then
19:       l^ij ← l^ij + 1 upto L_def^ij   ▷ ref. Eq. 3
20:       calculate p_d^ij                ▷ ref. Eq. 4
21:       sync action [Update]
22:     if (C_SYS = true) ∨ (t_avail ≥ epoch) ∨
23:       (∑_{i∈A} ∑_{j∈D_i} n^ij × C^ij ≥ T_cost) then break
24:     epoch ← epoch + 1   ▷ go to next epoch
```

An example algorithm (i.e., Algorithm 2) of an example security analyst mechanism/process module ($M_{SA}$) is shown below.

Algorithm 2 The Security Analyst Process

```
1:  procedure SA
2:    Init: state ← 0 , f_p ← 0
3:    Init: p_w, f_d, F_th                ▷ ref Table 1
4:    sync action [T3]         ▷ synchronizing action
5:    select state ← 1 with prob. p_w,
6:              ← 2 with prob. (1 − p_w)
7:    if (state = 1) then
8:      if f_p ≤ F_th then
9:        if alert = false then
10:         state ← 3,f_p, ++ with prob. p_high1
11:               ← 4,f_p, ++ with prob. (1 − p_high1)
12:       else
13:         state ← 3,f_p ++ with prob. p_high2
14:               ← 4,f_p,++ with prob. (1 − p_high2)
15:     else
16:       if alert = false then
17:         state ← 3 with prob. p_high1 · f_d
18:               ← 4 with prob. (1 − p_high1 · f_d)
19:       else
20:         state ← 3 with prob. p_high2 · f_d
21:               ← 4 with prob. (1 − p_high2 · f_d)
22:   if (state = 2) then
23:     if f ≤ F_th then
24:       if alert = false then
25:         state ← 3,f_p ++ with prob. p_low1
26:               ← 4,f_p ++ with prob. (1 − p_low1)
27:       else
28:         state ← 3,f_p ++ with prob. p_low2
29:               ← 4,f_p ++ with prob. (1 − p_low2 )
30:     else
31:       if alert = false then
32:         state ← 3 with prob. p_low1 · f_d
33:               ← 4 with prob. (1 − p_low1 · f_d)
34:       else
35:         state ← 3 with prob. p_low2 · f_d
36:               ← 4 with prob. (1 − p_low2 · f_d)
37:   sync action [Update]
38:   state ← 0
```

In some implementations, the disclosed system/method bridges a gap between industrial risk finding practices and theoretical risk analysis. In some implementations, the system/method enhances the scalability and adaptability of the smart system concept design and deployment. In some implementations, the disclosed method reduces time needed to assess system/network risk accurately without actual deploying the system/network. In some implementations, the disclosed method obviates the need to consider trivial/routine implementation details during risk analysis. In some implementations, the system/method identifies even subtle security risks. In some of the implementations, the system/method identifies/assesses not only known attacks but also future attacks (both real and hypothetical). In some implementations, the system/method improves the productivity of security engineers. In some implementations, the system/method identifies the components of a system/network that need to be replaced if the components are not effective. The system/method provides effective and efficient utilization of security budgets by identifying components with significant impact on the reduction of security risks, in some implementations.

In some implementations, the three levels/tiers of defense and corresponding probabilities of identifying/capturing threats at each of the three levels/tiers of defense are captured using the following equations. The cost of an attack $C_a$, the number of vulnerable components $N_{vul}$, and the malicious component ratio $\mu$ are also shown in the below equations.

$$DEF_{T1} = \begin{cases} \text{success}, & \text{with}(1-p_a^{ij}) \\ \text{failure}, & \text{with } p_a^{ij} \end{cases} \quad (1)$$

$$DEF_{T2} = \begin{cases} \text{success}, & \text{with } p_d^{ij} \\ \text{failure}, & \text{with}(1-p_d^{ij}) \end{cases} \quad (2)$$

$$L_{def}^{ij} = \begin{cases} \lceil \log\left(\frac{1}{y}\right) \frac{p_d}{\log(1+f_{def})} \rceil, & p_d^{ij} > 0 \\ l, & \text{otherwise} \end{cases} \quad (3)$$

$$p_d^{ij} = \begin{cases} p_d^{ij} \cdot (1+f_{def})^{l^{ij}}, & l^{ij} \leq L_{def}^{ij} \\ 1, & \text{otherwise} \end{cases} \quad (4)$$

$$p_{low}(f_p) = \begin{cases} p_{low}(0), & f_p < F_{th} \\ f_d \cdot p_{low}(0), & f_p \geq F_{th} \end{cases} \quad (5)$$

$$DEF_{T3} = \begin{cases} \text{success}, & \text{with } p_w(f_p) \\ \text{failure}, & \text{with}(1-p_w)(f_p)) \end{cases} \quad (6)$$

$$C_a = \sum_{a_i \in A} \sum_{d_j \in D_i} n_{ij} \times c_{ij} \quad (7)$$

$$\Phi = \bigvee_{i \in A} \phi_i \quad (8)$$

$$\phi_i = \psi_1 \odot \psi_2 \odot \psi_3 \odot \bullet \bullet \bullet \psi_k \quad (9)$$

$$N_{vul} = \sum_{1 \leq i \leq m} |D_i| - \sum_{1 \leq i \leq j \leq m} |D_i \cap D_j| + \\ \sum_{1 \leq i \leq j \leq k \leq m} |D_i \cap D_j \cap D_k| - [] + (-1)^{m+1}|D_1 \cap D_2 \cap [] \cap D_m| \quad (10)$$

$$\mu = \frac{N_{comp}}{N_{vul}} \quad (11)$$

Figure 4:
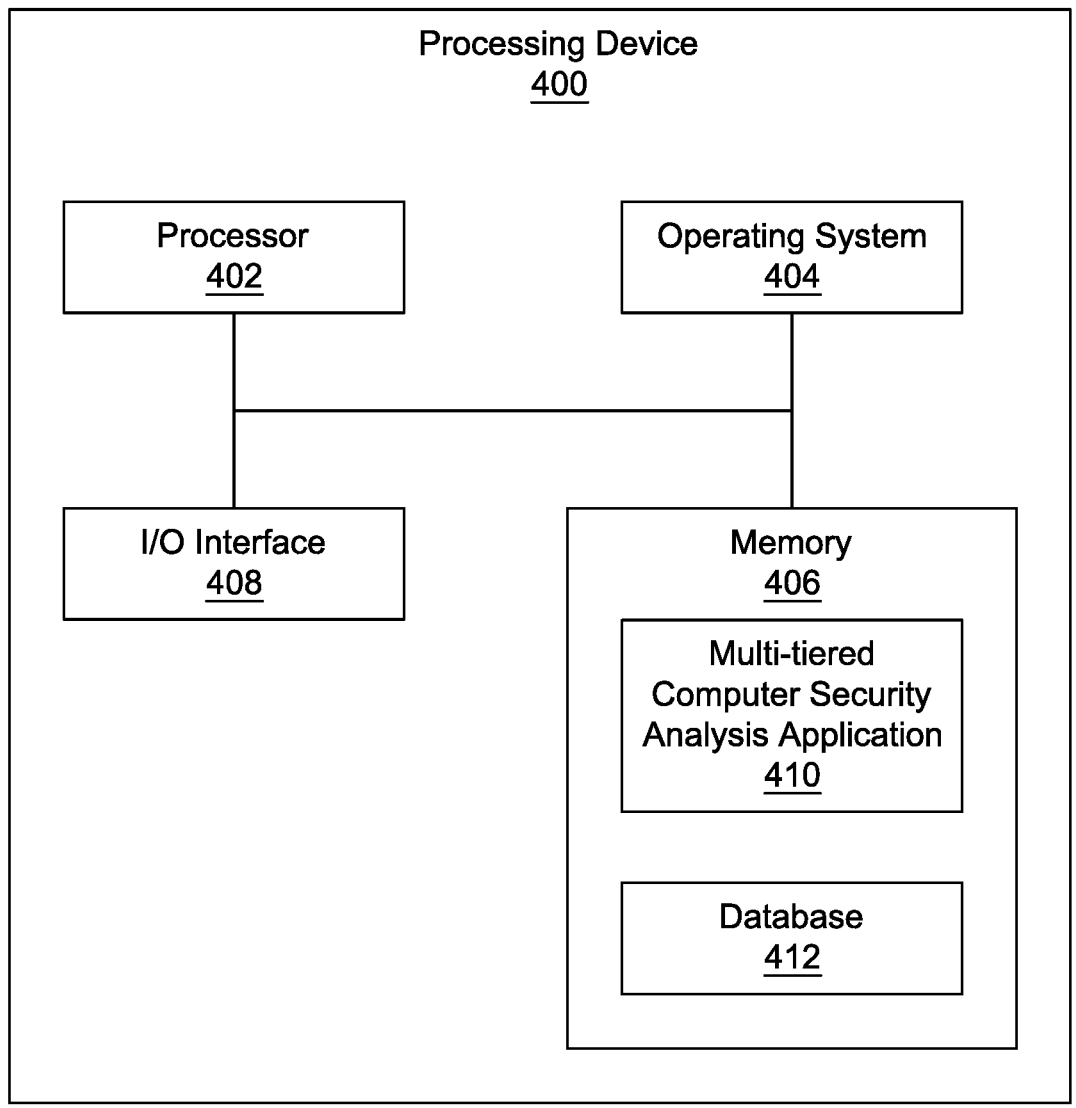
FIG. 4 is a diagram showing an example computing device configured to provide multi-tiered computer security analysis in accordance with some implementations.

FIG. 4 is a block diagram of an example processing device 400, which may be used to implement one or more features described herein. In one example, device 400 may be used to implement a computer device to provide multi-tiered/multi-level computer security analysis, for example, security analysis for a device, system, and/or network as described herein, and perform appropriate method implementations described herein. Device 400 can be any suitable computer system, server, or other electronic or hardware device. For example, the device 400 can be a mainframe computer, a desktop computer, a workstation, a portable computer, or an electronic device (portable device, mobile device, cell phone, smart phone, tablet computer, television, TV set top box, personal digital assistant (PDA), media player, game device, wearable device, etc.). In some implementations, device 400 includes a processor 402, an operating system 404, a memory 406, and input/output (I/O) interface 408.

Processor 402 can be one or more processors and/or processing circuits to execute program code and control basic operations of the device 400. A "processor" includes any suitable hardware and/or software system, mechanism, or component that processes data, signals, or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations by different (or the same) processing systems. A computer may be any processor in communication with a memory.

Memory 406 is typically provided in device 400 for access by the processor 402, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from the processor 402 and/or integrated therewith. Memory 406 can store software operating on the device 400 by the processor 402, including an operating system 404, one or more applications 410, and a database 412. In some implementations, applications 410 can include instructions that enable processor 402 to perform the functions described herein (e.g., in FIG. 2 and FIG. 3).

For example, application 410 can include providing multi-tiered computer security analysis, for example, security analysis for a device, system, and/or network as described herein. Any of the software in memory 404 can alternatively be stored on any other suitable storage location or computer-readable medium. In addition, memory 404 (and/or other connected storage device(s)) can store machine learning model (e.g., SVM) information, and/or other instructions and data used in the features described herein. Memory 404 and any other type of storage (magnetic disk, optical disk, magnetic tape, or other tangible media) can be considered "storage" or "storage devices."

I/O interface 408 can provide functions to enable interfacing of the processing device 400 with other systems and devices. For example, network communication devices, storage devices (e.g., memory and/or database), and input/output devices can communicate via interface 408. In some implementations, the I/O interface 408 can connect to interface devices, including input devices (keyboard, pointing device, touchscreen, microphone, camera, scanner, etc.) and/or output devices (display device, speaker devices, printer, motor, etc.).

For ease of illustration, FIG. 4 shows one block for each of processor 402, memory 406, I/O interface 408, and software block 410. These blocks may represent one or more processors or processing circuitries, operating systems, memories, I/O interfaces, applications, and/or software modules. In other implementations, device 400 may not have all of the components shown and/or may have other elements, including other types of elements instead of, or in addition to, those shown herein.

Example Implementation—Smart Cities

Although IoT-based smart cities are being designed, security concerns pertaining to smart city services may impede adoption. Existing security research uses hyper-focused approaches to address security issues. Such discrete solutions may not be enough to counter cyber threats in smart cities. The disclosed method/system adopts a comprehensive approach to model smart city (SC) security. This method and system can be used by the SC management teams to assess risk of attacks and configure security systems accordingly. Specifically, the disclosed system uses a defense framework that represents the security of smart city service infrastructure at a higher level of abstraction. In some implementations, the framework includes component and system-level defenses and a SOC SA, whose analyst domain and situational knowledge plays a critical role in identifying threats. The disclosed method and system allow for calculation of the risk of existing attacks as well as hypothetical future attacks. In some implementations, the method and system can be applied to assess the security of several SC facilities/services, including power plants, intelligent transport systems, and smart healthcare systems. Some implementations assess resilience in face of coordinated attacks based on a study of consolidated risk analysis of distributed city-wide facilities to ensure that such attacks can be prevented or thwarted.

Smart cities (SC) encompass facilities that require high levels of security. Such facilities include government offices, financial centers, and research centers. Some of the presently disclosed implementations perform risk analysis of the security of SC facilities. The attack scenarios considered are based on the commonly studied attacks in the research literature. (See, M. Mohsin, M. U. Sardar, O. Hasan, and Z. Anwar, "IoTRiskAnalyzer: A probabilistic model checking based framework for formal risk analytics of the Internet of Things," *IEEE Access*, vol. 5, pp. 5494-5505, 2017, which is incorporated herein by reference; and G. Lenzini, S. Mauw, and S. Ouchani, "Security analysis of socio-technical physical systems," *Comput. Elect. Eng.*, vol. 47, pp. 258-274, Oct. 2015, both incorporated herein by reference).

Some implementations also consider attacks such as blind and persistent attacks. Some implementations address a variety of scenarios comprised of different configurations and types of attacks. In some implementations, if an attack is considered to be successful in a particular configuration, the security of the respective system can be increased by changing the configuration (e.g., by adding a redundant link between two components). The disclosed method and system may then be applied to assess the security of the updated configuration. The disclosed method and system can perform security analysis of both known and hypothetical/future configurations of attacks as the types of attacks and corresponding attack scenarios/configurations evolve over time.

In some implementations, an SC includes a security operations center (SOC) for monitoring secure facilities. Some implementations address two categories of threats: (a) unauthorized entry into the premises (physical intrusion), which could lead to other attacks such as theft and sabotage; and (b) remote unauthorized interference with the infrastructure, which includes manipulation of sensor data, unwarranted actuation, and disruption of network communication between different service components, among others.

In some implementations, a secure facility has a primary entrance, which is controlled by an actuator ($A_{door}$) to open/close the entrance and a sensor ($S_{door}$) to monitor the actuator. In some implementations, the facility entrance opens automatically whenever there is an emergency, to ensure a quick and safe evacuation. The emergency situation depends on the type of facility. In some implementations, the emergency can be fire, radiation, chemical release, etc. In some implementations, emergency events are monitored by emergency sensors ($S_{emer}$) and alarm actuators ($A_{alarm}$). In some implementations, the end devices (sensors and actuators) are connected to a gateway (GW) through wireless connections. In some implementations, the GW connects to a controller and a private cloud through a router. In some implementations, the private cloud enables interaction with SC emergency services.

Figure 5:
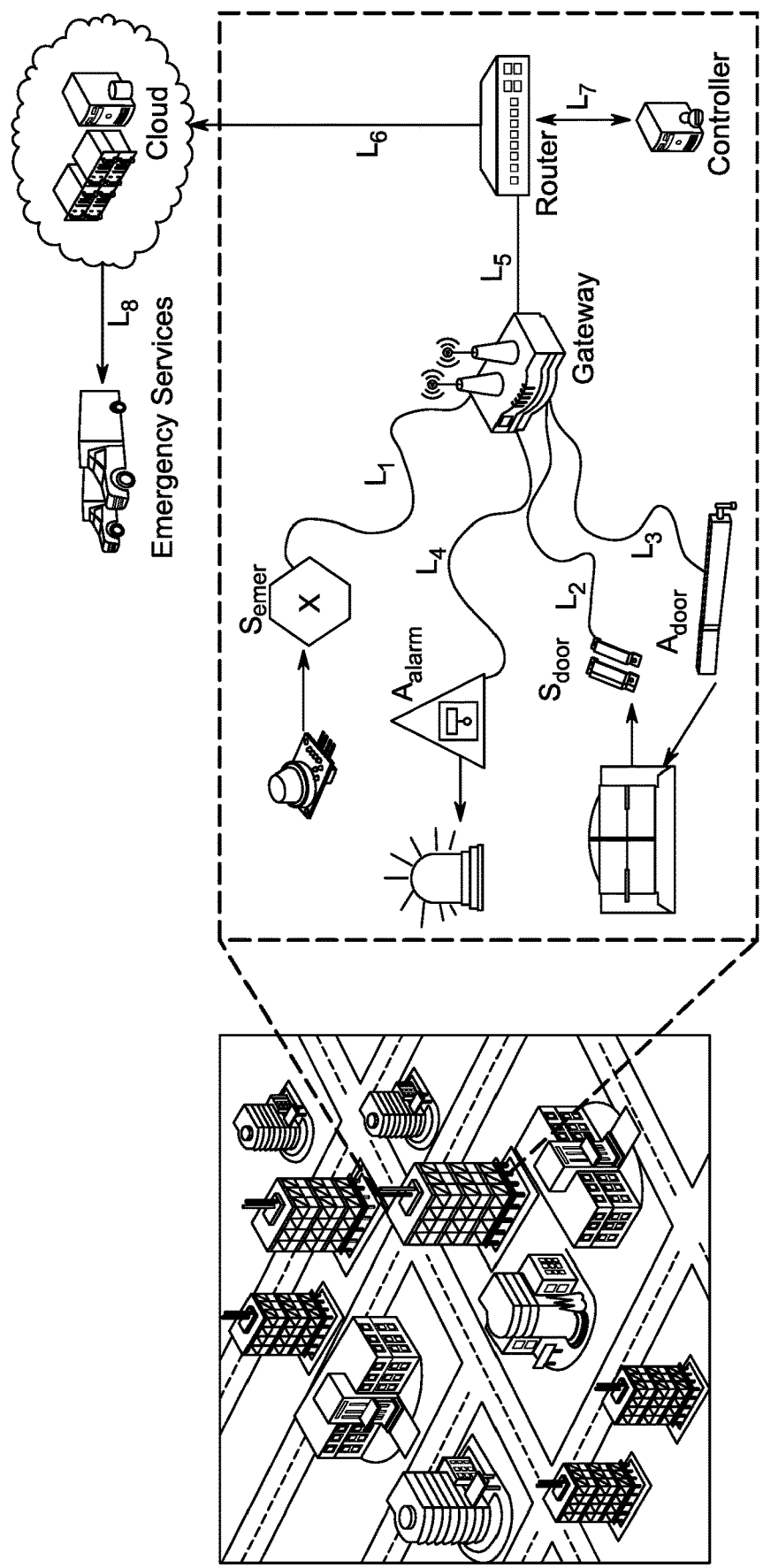
FIG. 5 is a diagram of an exemplary configuration of an example security system in accordance with some implementations.

FIG. 5 is a diagram of an exemplary configuration of an example security system. The components of this security system may have vulnerabilities to different types of threats. (See, M. Mohsin, M. U. Sardar, O. Hasan, and Z. Anwar, "IoTRiskAnalyzer: A probabilistic model checking based framework for formal risk analytics of the Internet of Things," *IEEE Access*, vol. 5, pp. 5494-5505, 2017, which is incorporated herein by reference; and Q. M. Ashraf and M. H. Habaebi, "Autonomic schemes for threat mitigation in Internet of Things," *J. Netw. Comput. Appl.*, vol. 49, pp. 112_127, March 2015., both incorporated herein by reference). For example, (a) wireless links ($L_1$ to $L_4$) may be susceptible to jamming or collision attacks, which may result in missed alarms and/or repudiated actuation; (b) Zigbee implementation of communication protocols in the GW can be compromised by modifying traffic and/or triggering actuators; (c) authentication mechanisms of the sensors can be compromised, leading to impersonation of sensors and transmission of false sensor alerts to the GW, (d) authentication mechanisms of actuators can be compromised by impersonating the GW and sending false actuation commands to the actuators.

In some implementations, the following attacks are considered for the configuration of the security system shown in FIG. 5:

1) Unauthorized Entry or Physical Intrusion (PI): This attack could be carried out in two ways. One way is to compromise $A_{door}$ by sending an unauthorized actuation command to open the door. This may be done by compromising the authentication mechanism of $A_{door}$, thereby allowing masquerading of commands, for example, to make the commands appear to originate from the GW. Similarly, PI can be achieved by manipulating the packet data and compromising the integrity of the protocol data or by replaying old valid data. Further, to avoid alerts from $S_{door}$, the link ($L_2$) needs to be jammed briefly until the door is closed.

If an attacker is unable to compromise $A_{door}$, the attacker may create a fake emergency alert from $S_{emer}$. This can be done by either replaying old data or by flipping the bits in the latest message from $S_{emer}$ to the GW. Then GW will then take action by actuating $A_{door}$ and $A_{alarm}$, and sending alerts to emergency services. The attacker/intruder must block links $L_4$ and $L_5$ to avoid these alerts. PI attack can be expressed as:

$$PI = (C_{Adoor} \hat{\ } C_{L2}) \vee (C_{Semer} \hat{\ } C_{L4} \hat{\ } C_{L5}).$$

2) Generating a false alarm (False Positive, FP): Here, the attacker simply wants to create chaos with false alarms. The attacker may replay an old message or flip the bits in the latest message sent by the sensors $S_{emer}$ or $S_{door}$. For simplicity, manipulation of the GW is not considered to be possible in this case. FP attack can be expressed as:

$$FP = C_{Semer} \vee C_{Sdoor}.$$

3) Jamming Communication Channel (MA): In this attack, the attacker wants to interfere during a real emergency situation by suppressing the commands sent to $A_{door}$ and $A_{alarm}$. This can be achieved by jamming links $L_3$, $L_4$, and/or $L_5$, depending on the severity of the attack. Blocking commands on one link is sufficient to create chaos in the system, but complete suppression of alert/actuation commands can induce maximum loss. These two cases are considered separately as $MA_{low}$ and $MA_{high}$, which can be expressed as:

$$MA_{low} = C_{L3} \vee C_{L4} \vee C_{L5}$$

and $$MA_{high} = C_{L3} \hat{\ } C_{L4} \hat{\ } C_{L5}$$

4) Blind attack (BA): When an attacker does not possess enough information about the type of attack or the components related to a particular attack, the attacker may choose to undermine the system security as best as possible by launching a blind attack on randomly selected components to sabotage any part of the system. BA can be expressed as:

$$BA = \forall d_j \in D_i, \bigwedge_{j=1}^{|D_i|} C_{d_j}$$

where $D_i \in P(D) \setminus \emptyset$ and $P(D)$ represent the power set of D.

In some implementations, system security against these attacks is analyzed using several parameters, including the following: probability of attack ($p_a$), tier-2: defense ($p_d$), tier-3: type of the security analyst (SA) (novice, expert, average), workload level of SA, attack type (PI, FP, $MA_{low}$, $MA_{high}$, or BA), and attacker resources (such as maximum available time and attack cost).

In some implementations, the attack-defense and SA models given by Algorithm 1 and Algorithm 2 are implemented using a prominent probabilistic model checker, PRISM. Values of parameters used in some implementations are listed in Table 1. For example, the values of these parameters can be obtained from existing security system implementations.

TABLE 1

Parameter values used in PRISM

| | | |
|---|---|---|
| Tier-1 | $p_{a1}{}^{ij}$, $p_{a2}{}^{ij}$ | 0.5, 0.8 |
| Tier-2 | $p_d{}^{ij}$ | 0.5 |
| Tier-3 (workload probability $p_w$ = 0.5) | Expert ($p_{high\,1,\,2}$, $p_{low1,\,2}$, $f_d$, $F_{th}$) | 0.5, 0.8, 0.7, 0.98, 0.8, 10 |
| | Average ($p_{high\,1,\,2}$, $p_{low1,\,2}$, $f_d$, $F_{th}$) | 0.3, 0.6, 0.5, 0.8, 0.7, 5 |
| | Novice ($p_{high\,1,\,2}$, $p_{low1,\,2}$, $f_d$, $F_{th}$) | 0.1, 0.4, 0.3, 0.6, 0.5, 2 |
| Components related to attacks | Physical intrusion (PI) | $A_{door}$, L2, $S_{emer}$, L4, L5 |
| | False alarm (FP) | $S_{emer}$, $S_{door}$ |
| | Missed alarm/ actuation (MA) (low/high) | L3, L4, L5 |
| | Blind attack (BA) | $\forall d \in D, D_i \subseteq D$ |

In some implementations, system behaviour patterns from system logs can be used to extract parameter values. However, when these security parameters cannot be obtained from real-world scenarios, a value range can be used. The Common Vulnerability Scoring System (CVSS) uses similar means to assess the severity of vulnerabilities. (See, M. Ge, J. B. Hong, W. Guttmann, and D. S. Kim, "A framework for automating security analysis of the Internet of Things," *J. Netw. Comput. Appl.*, vol. 83, pp. 12_27, September 2017, which is incorporated herein by reference). Further, all components are assumed to possess similar anomaly detection ability at the tier-2 level. Chen et al. made similar assumptions (See, P. Y. Chen, S. M. Cheng, and K. C. Chen, "Information fusion to defend intentional attack in Internet of Things," *IEEE Internet Things J.*, vol. 1, no. 4, pp. 337_348, August 2017, which is incorporated herein by reference).

In some implementations, once the disclosed model is implemented in PRISM, system specifications can be expressed in LTL and verified against the model. The following are example LTL formula from some implementations for assessing system properties:

1) Find the probability of a successful attack:
$P_{max}=?[F_{attackSuccess}]$ where attackSuccess is a Boolean formula defined in such a way that it becomes true when defense fails at all the layers/levels/tiers.

2) Find the probability of reaching a state of interest, such as a state s representing the failure of defense at level 1: $P_{max}=?[F_{state=s}]$ 3) Find the probability of launching a successful attack within given time constraints:
$P_{max}=?[F_{attackSuccess}$ & epoch<Time], where Time is a threshold value for an attack to be successful.

4) Find the cost of attack within some time constraints:
$R\{\text{"Attack\_Cost"}\}max=?[C<=Time]$, where C represents the PRISM construct for cumulative, and attack cost is a PRISM variable that increments the associated cost value whenever an attack is launched.

5) Find the number of failed attempts within given time constraints: $R\{\text{"failed\_attempts"}\}max=?[C<=Time]$, where failed_attempts is defined as a PRISM variable that is incremented by 1 whenever an attack is launched but foiled at any defense layer/level/tier.

Persistent Attacks

SC security management team is often interested in estimating the possibility of attack (risk) and the associated attack overhead (cost) when a persistent attacker has unlimited time. This estimation needs to be done for each attack after appropriate defense measures are taken.

In some implementations, to establish an analysis baseline, average probabilities are considered under normal circumstances. In some implementations, the probability of compromising a component in the system by exploiting the vulnerabilities at tier-1 ($p^{ij}{}_a$) and the probability of successfully detecting of attack at tier-2 ($p^{ij}{}_d$) are taken to be 0.5. In some implementations, the SA is assumed to be working under normal workload conditions and is expected to be monitoring the system at tier-3.

Figure 6:
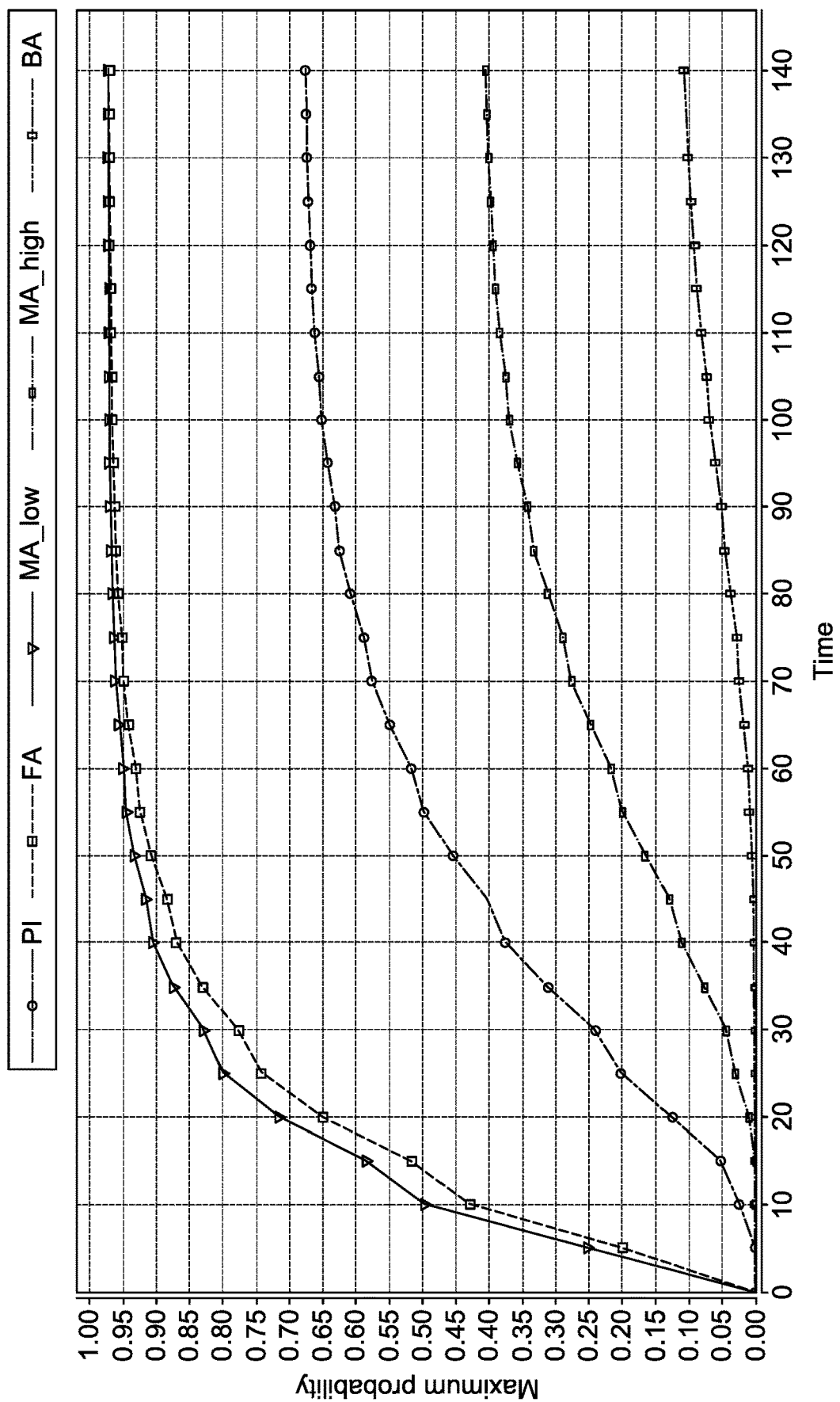
FIG. 6 is a graph plotting example probability of attack success over time for Physical Intrusion (PI), False Alarm (FA), Missed Alert (MA), and Blind Attack (BA) in accordance with some implementations.
Figure 7:
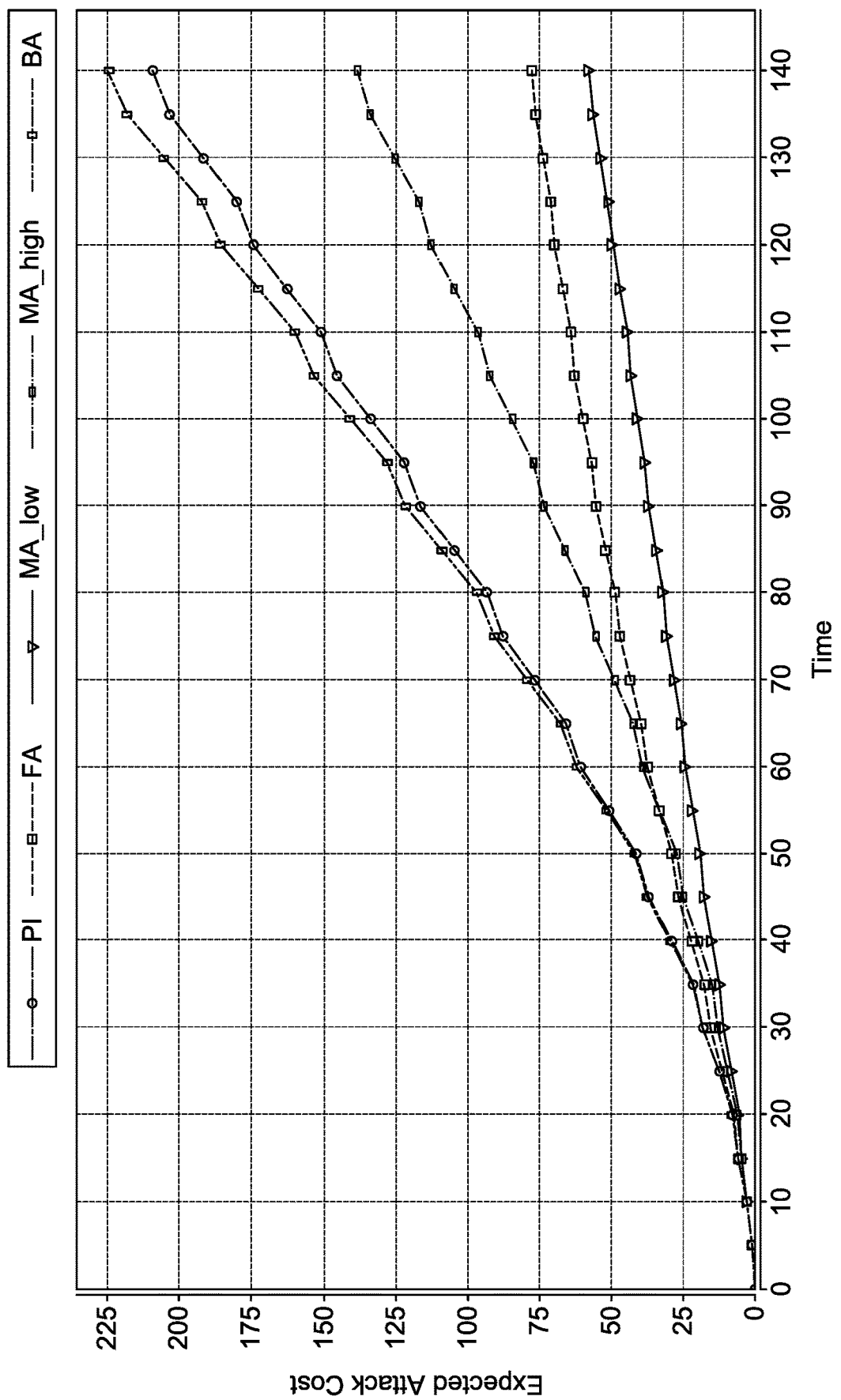
FIG. 7 is a graph plotting example attack cost over time for Physical Intrusion (PI), False Alarm (FA), Missed Alert (MA), and Blind Attack (BA) in accordance with some implementations.

In some implementations, using the aforementioned parameters, the disclosed model is used to calculate the risk and attack overhead for different types of attacks, with the results plotted in FIG. 6 and FIG. 7. The figures show that (a) when an attack needs to compromise only one component from the available set of components, it has a higher chance of success. For this reason, FP and $MA_{low}$ have a very high risk. Conversely, $MA_{high}$ has a lower risk because an attacker needs to suppress all alerts. This is a difficult task since it requires compromising several components and suppression of all alerts may generate additional alerts from tier-2 defense; (b) PI attack also involves compromising more than one component, but there are different ways of attacking, leading to average risk and attack overhead; (c) when an attacker has no information about the system, as in the case of BA, the attack overhead is very high and the probability of success is very low; (d) after a certain time threshold, the probability of a successful PI, $MA_{high}$, or BA becomes constant and cannot be increased, no matter how long an attacker tries. These attacks require multiple attempts, which result in activation of appropriate countermeasures, as described in Eqs. 2 and 3. Therefore, the attack success probability becomes constant after a certain time.

Figure 8:
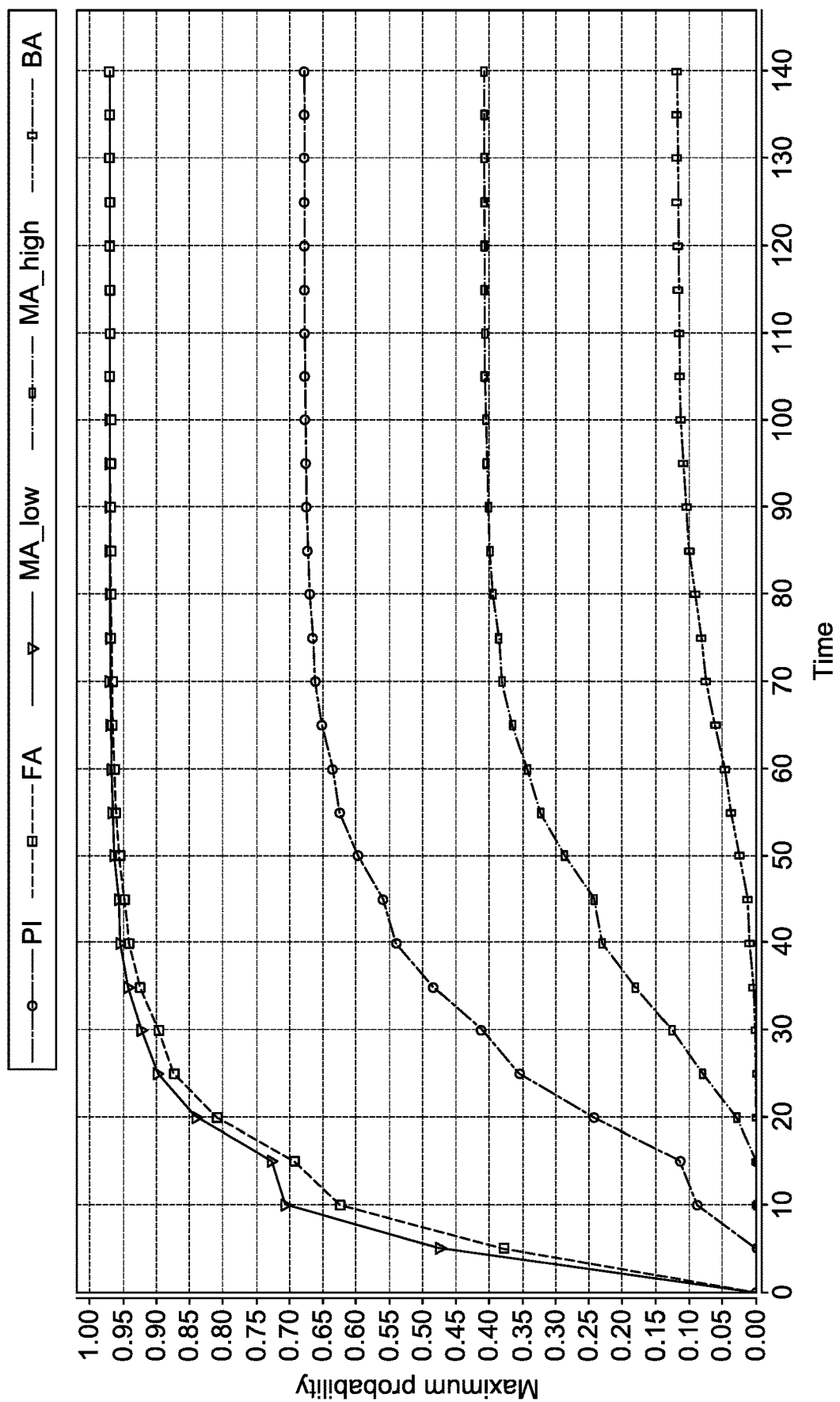
FIG. 8 is a graph plotting example probability of attack success over time for an advanced persistent attacker in accordance with some implementations.

In some implementations, to model an attacker with better attack capabilities, FIG. 8 plots the probability of attack success for an advanced persistent attacker (that is, tier-1 defense can be compromised with $p_a$=0.95, and tier-2 and tier-3 parameters are unchanged). The figure shows that increasing the value of $p_a$ does not increase probability of a successful attack in the long run. The difference is that the attacker is able to exploit the system faster.

In some implementations, depending upon a variety of input parameters, the above plots/graphs provide insights that can be used to design better security systems. For instance, FIG. 6 shows that, with a time constraint of 50 units and relatively average attack/defense probabilities, the probability of BA is less than 1%, whereas $MA_{low}$ has a success probability of more than 90%, even when an attacker has stringent time requirements (40 time units).

Role of Defense Tiers

Figure 9:
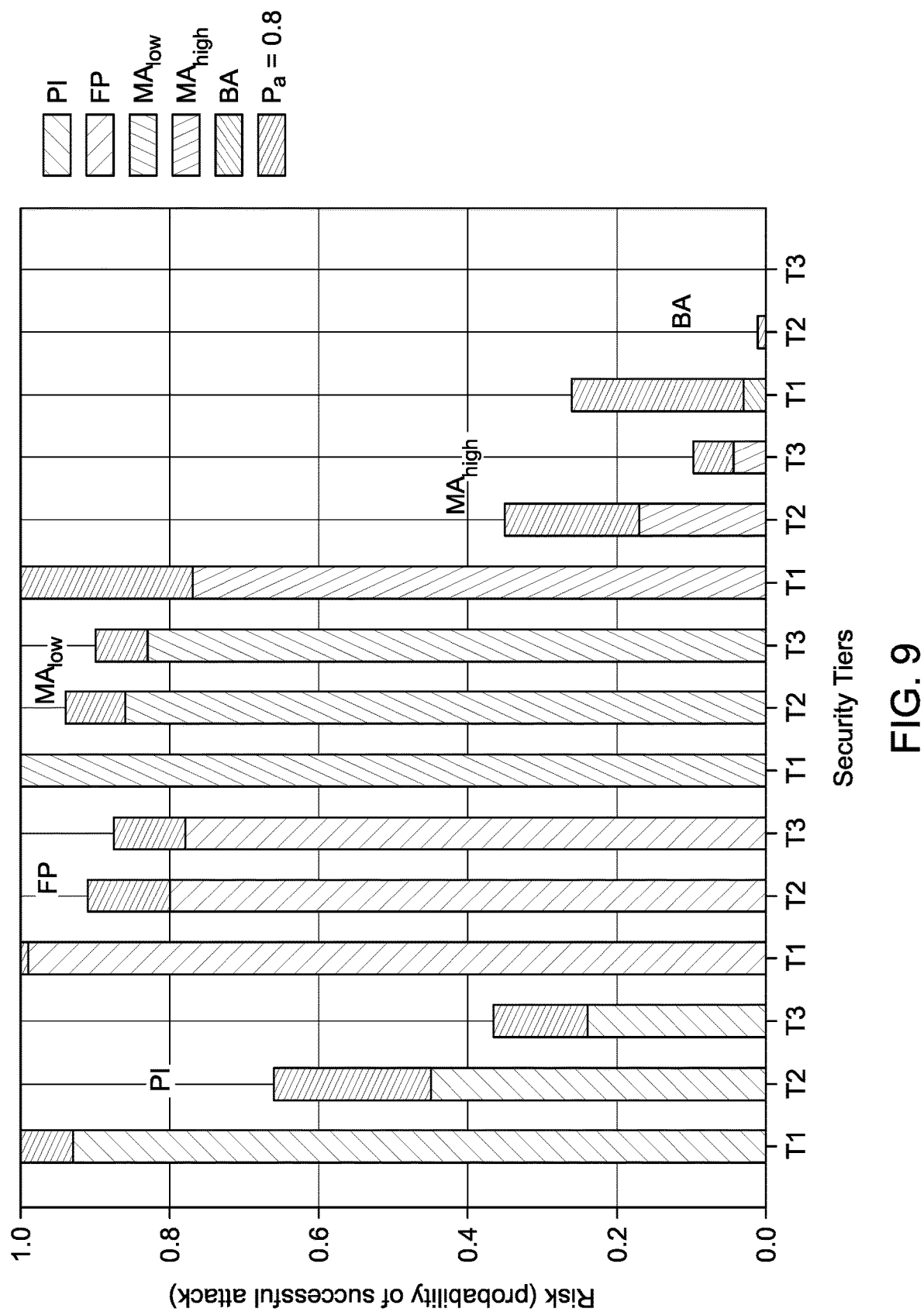
FIG. 9 is a graph showing example impact of risk mitigation at different tiers of defense for Physical Intrusion (PI), False Positive (FP), Missed Alert (MA), and Blind Attack (BA) in an exemplary security system in accordance with some implementations.

The SC security management team is often interested in understanding the role of different tiers in mitigating attacks. In some implementations, the disclosed model can be used to calculate the risk, attack overhead, and the percentage of foiled attempts associated with each attack type for different defense tiers. In some implementations, for this purpose, three distinct cases are considered: T1 (tier 1 only), T2 (automated tier 2 defense with $p^{ij}_d$=0.5), and T3 (an average SOC analyst). Estimated attack risks associated with each additional tier of defense for the aforementioned five attack types for some implementations are shown in FIG. 9. FIG. 9 shows that each additional layer of defense significantly reduces the risk, especially for PI, $MA_{high}$, and BA attacks. Tier 2 (T2) reduces risk by 0.48, 0.19, 0.14, 0.61, and 0.02 respectively for PI, FA, $MA_{low}$, $MA_{high}$, and BA attacks. Similarly, inclusion of Tier 3 (T3) with an average SA reduces risk by 0.65, 0.21, 0.17, 0.71, and 0.02 respectively for PI, FA, $MA_{low}$, $MA_{high}$, and BA attacks.

Figure 10:
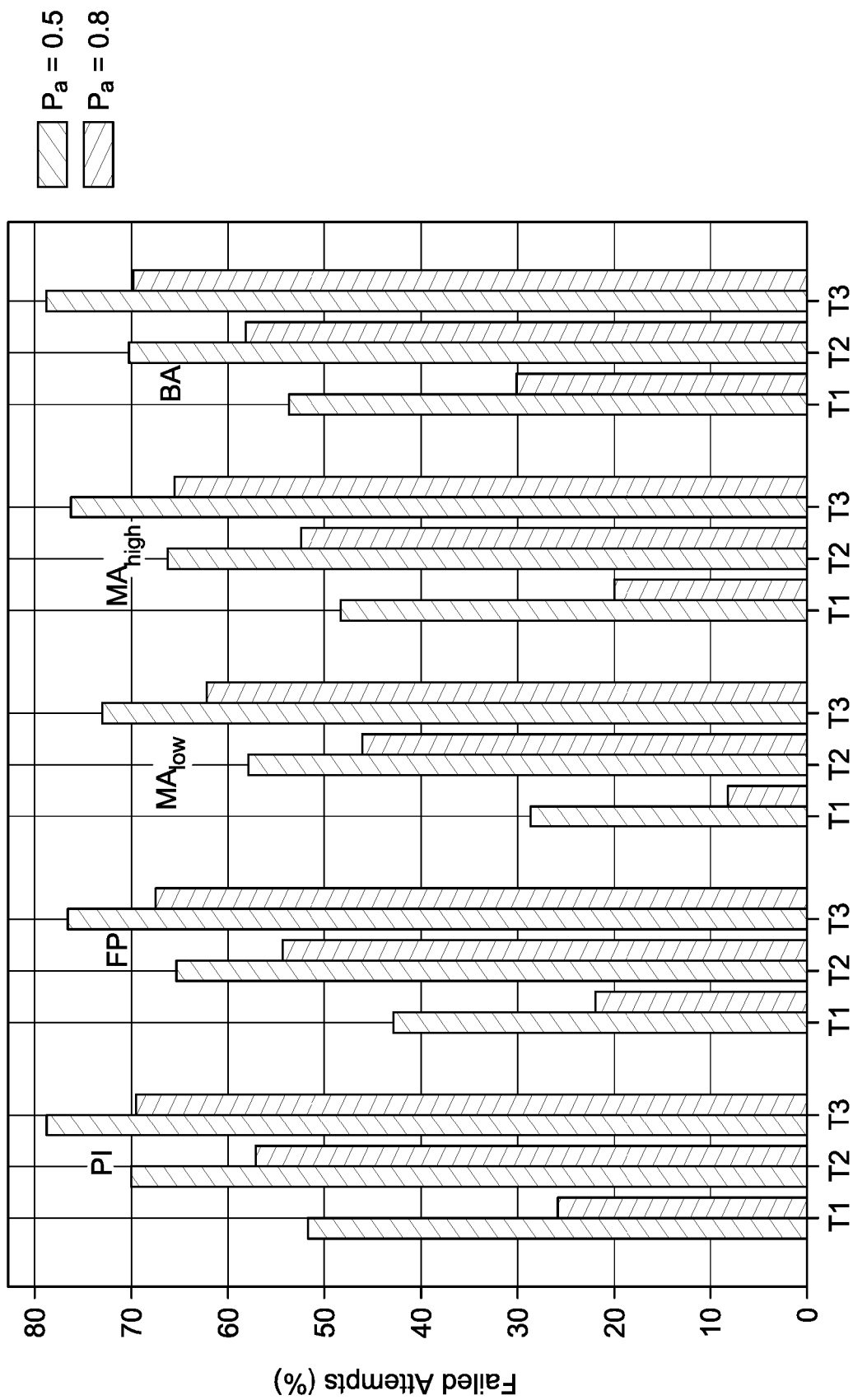
FIG. 10. is a graph showing example percentage of failed attack attempts at different tiers for Physical Intrusion (PI), False Positive (FP), Missed Alert (MA), and Blind Attack (BA) in accordance with some implementations.
Figure 11:
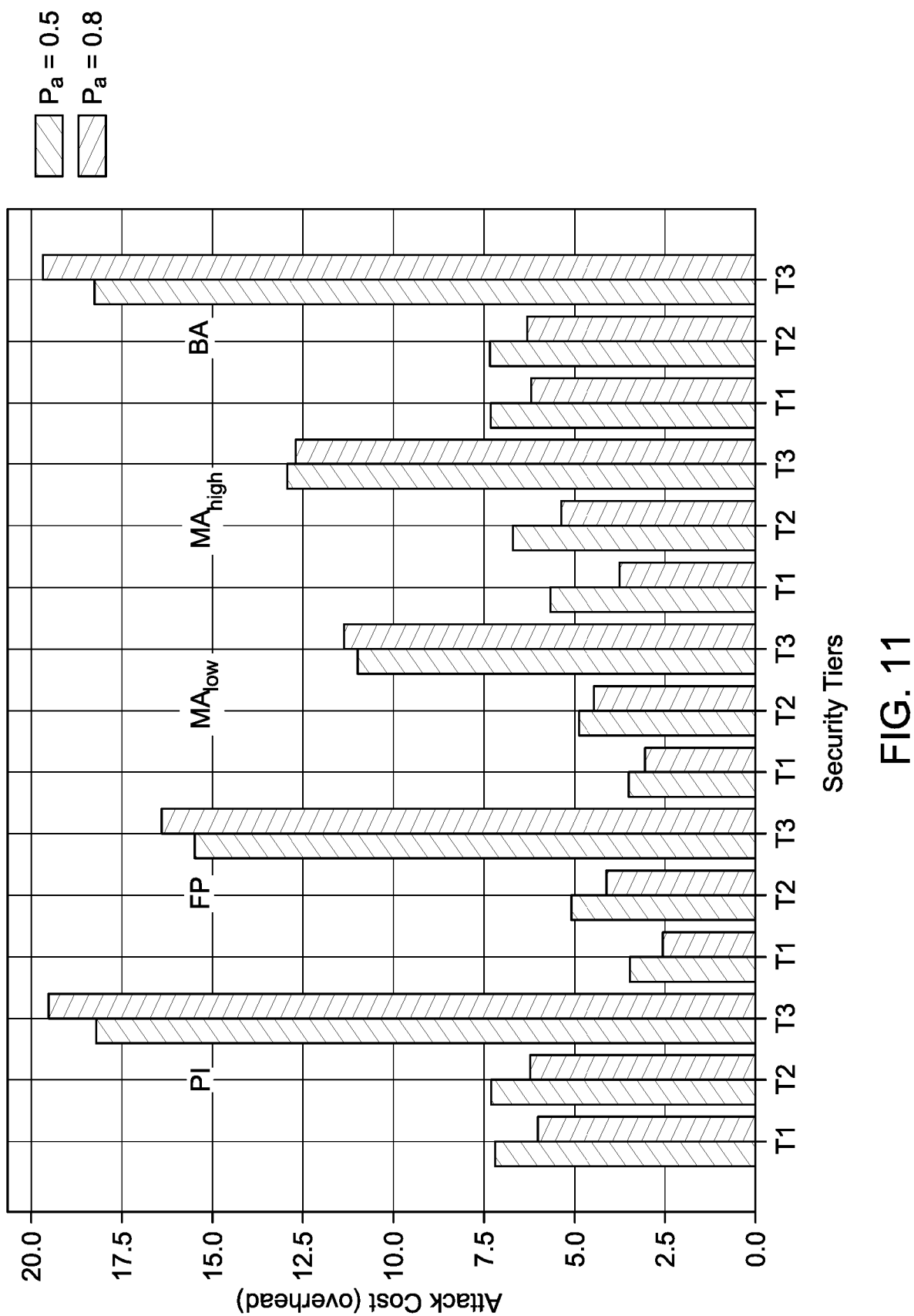
FIG. 11 is a graph showing example attack overhead cost at different tiers for Physical Intrusion (PI), False Positive (FP), Missed Alert (MA), and Blind Attack (BA) in accordance with some implementations.

These results highlight the importance of having an automated intrusion detection and prevention system (IDPS) at tier-2 to minimize risk. The influence of tier-3 may not be very significant from FIG. 9 alone, especially for FA and $MA_{low}$. However, when other parameters, such as "number of foiled attempts" and "attack overhead" are measured, the influence of tier-3 is evident. In some implementations, the disclosed model is used to measure these parameters as well. FIG. 10 and FIG. 11 display the percentage of foiled attempts and the attack overhead respectively at different tiers for various attack types. Inclusion of tier-2 and an SA at tier-3 increases the percentage of foiled attacks by 18% and 29% for PI, 22% and 31% for FP, 29% and 43% for $MA_{low}$, 18% and 27% for $MA_{high}$, and 17% and 25% for BA.

Some implementations address the question of whether tiers offer any benefit when a zero-day vulnerability is discovered and tier 1 defense can be compromised. In order to examine this scenario and calculate the associated risk, the number of foiled attempts, and the attack overhead, the probability of an attack being successful is increased to 0.8. The results are added to FIG. 9, FIG. 10, and FIG. 11. The probability of a successful attack with only tier-1 defense increases considerably and is 100% for all of the attack types, excluding BA.

The inclusion of tier-2 and tier-3 defense layers reduces the probability of a successful attack and increases the associated attack cost. These tiers reduce the risk and increase the cost for all types of attacks. For example, in the case of PI, the risk reduces from 100% to 36% and the number of failed attempts increase by at least 39%. Therefore, strong tier-2 and tier-3 defense layers/levels help a security system to better handle any unforeseen attacks.

SA Workload Impact

Figure 12:
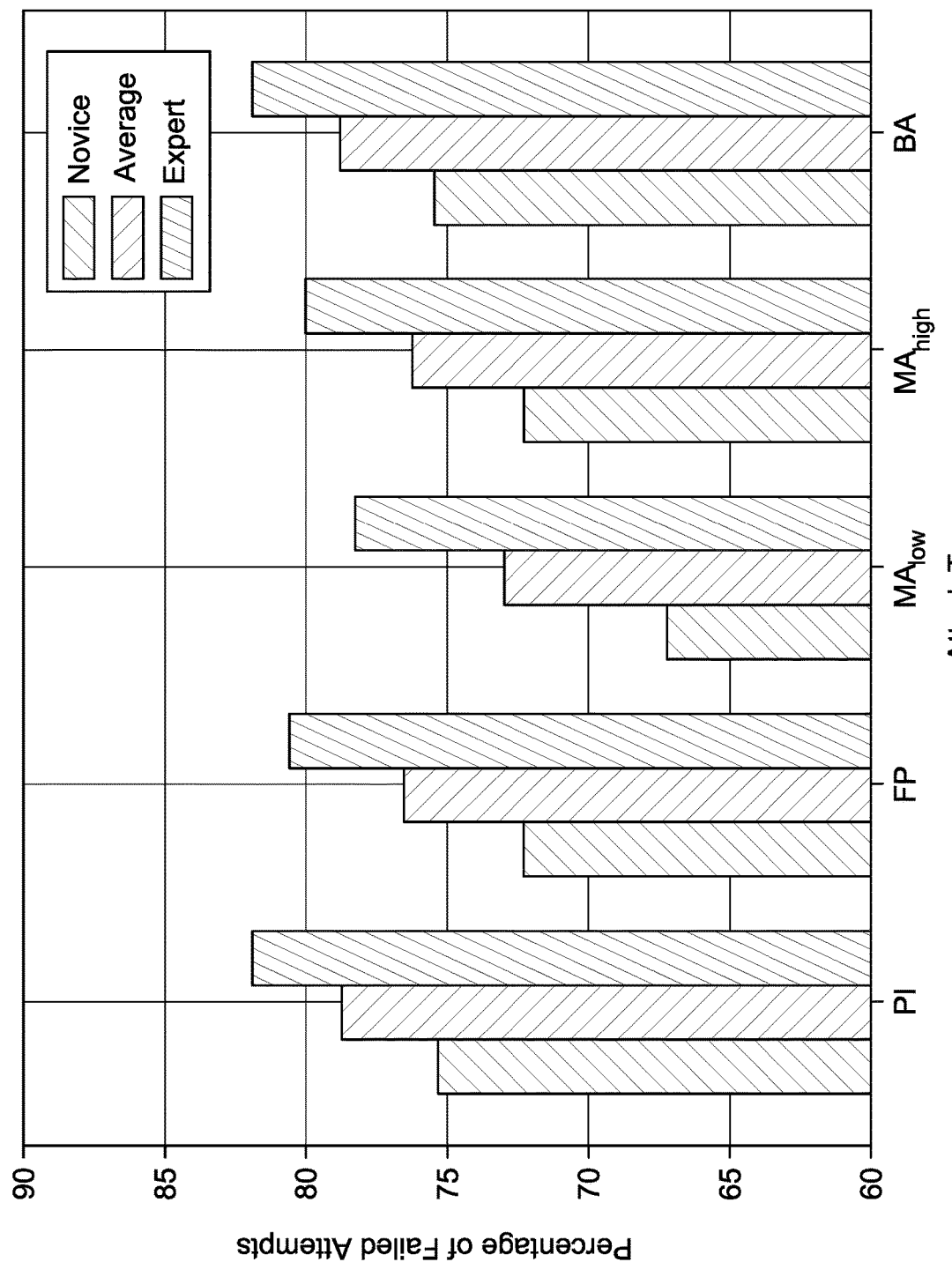
FIG. 12 is a graph showing example percentage of failed attack attempts for Physical Intrusion (PI), False Positive (FP), Missed Alert (MA), and Blind Attack (BA) for novice, average, and expert security analysts (SA) in accordance with some implementations.

Although the benefits of tier-3 defense are evident from the above analysis, real-time results depend upon the performance of the SA. Various factors, such as the skill level of the SA, fatigue threshold of the SA, current workload conditions, etcetera, play a vital role in assessing the influence of tier-3 defense. For this purpose, three SA types (novice, average, and expert) are considered. The parameters related to each type of SA are given in Table 1 above. FIG. 12 shows the percentage of foiled attacks for some implementations for different attack types (PI, FP, MA, and BA) and different SA skill levels (novice, average, and expert). Regardless of the attack type, SA skills positively influence the attack defense. A skilled SA thwarts more attacks, reduces the risk of attacks, and increases the attack costs.

Figure 13:
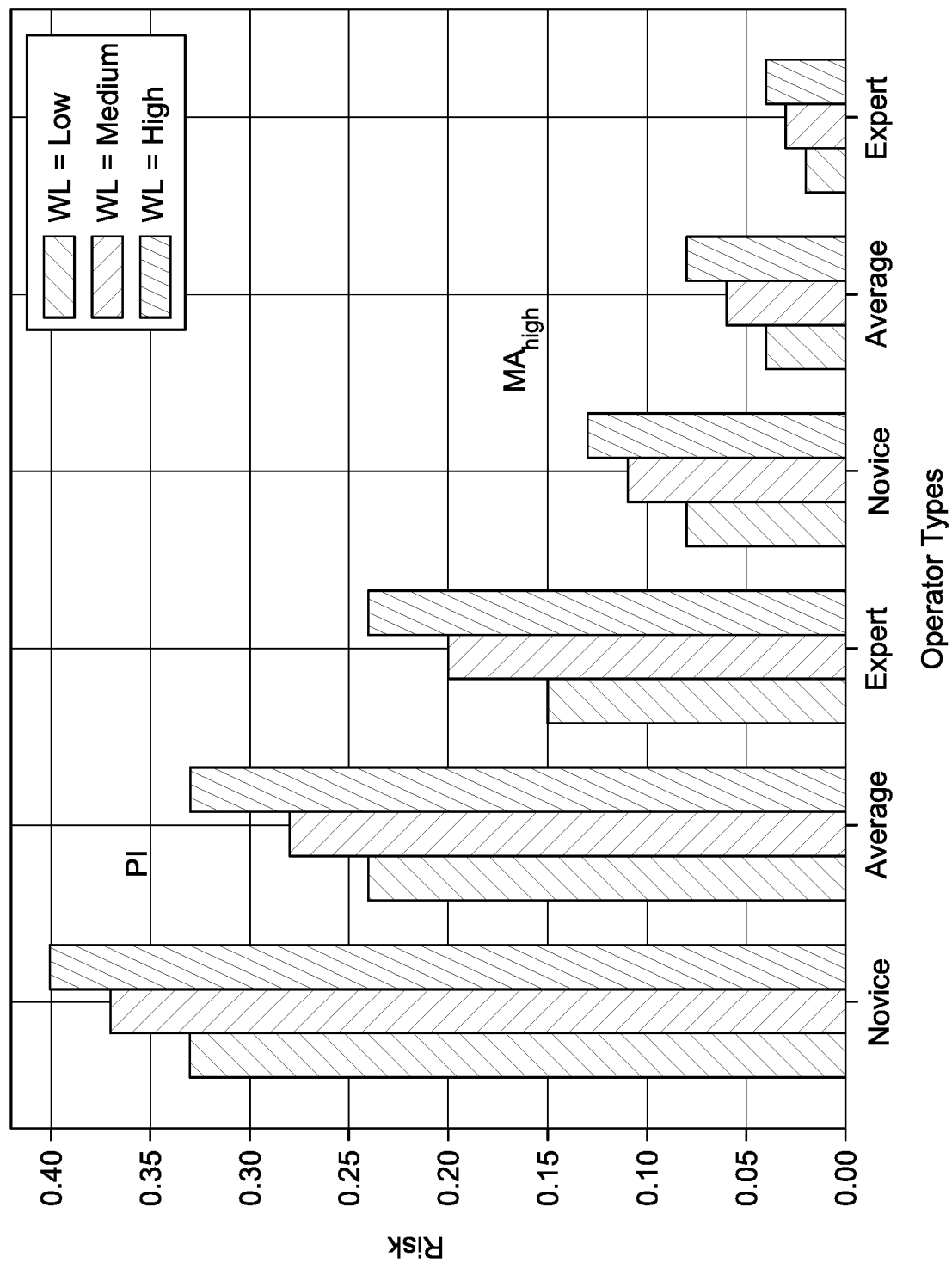
FIG. 13 is a graph showing example impact of operator workload on risk levels for three different workloads (low, medium, and high) and three different operator skill levels (novice, average, and expert) for two types of attacks in accordance with some implementations.

Despite an SA's inherent capabilities, the SA's performance is affected by external workload. FIG. 13 plots the risk levels for three different workloads (low, medium, and high) for three SA skill levels (novice, average, and expert) and for two types of attacks (PI and MA). Under heavy work-load, even an expert SA may perform similar to an average SA working under low workload conditions. This does not undermine the importance of expert SAs but shows the influence of workload on an SA's performance. Under heavy workload, having a higher number of average SAs than few expert SAs may lead to better results in strengthening tier-3 defense and reducing successful attacks.

In some implementations, a security designer is able to examine key parameters in the design of SC infrastructure using the disclosed model. Also, the security of SC services can be reassessed in some implementations in response to any changes to the system after the deployment of the disclosed model and/or in response to successful attacks after deployment.

In some implementations, the disclosed method/system allows a security designer to estimate risk and answer a broad range of security questions. The following are some non-exhaustive examples for demonstrating the versatility of the disclosed method/system/model.

1. New attack: In some implementations, the disclosed method and system define any new attack (hypothetical or real) and estimates related parameters such as risk and overhead cost for a wide variety of configurations. For instance, attack H is possible when either $S_{door}$, $A_{door}$ and link $L_2$ or links $L_3$, $L_4$ and $L_5$ are compromised, along with $S_{emer}$ and links L or L, are compromised.

This hypothetical attack can be expressed as:

$$H=((C_{Sdoor} \char`\^ CA_{door} \char`\^ C_{L2}) \vee (C_{L3} \char`\^ C_{LA} \char`\^ C_{L5}))\char`\^ (C_{Semer} \char`\^ C_{LA} \vee C_{L5}).$$

2. New vulnerability: In some implementations, the disclosed method/system/model estimates the risk of overall service compromise when one particular component of the system is found to have a new vulnerability. For example, $A_{door}$ has a new vulnerability that makes a masquerading attack very easy.

3. New defense mechanism or design: In some of the implementations, the disclosed method/system/model measures the effectiveness of new defense mechanisms with respect to overall security, such as the ability of the new defense mechanisms to prevent attacks. For example, an update in IDPS can detect masquerading attempts on $A_{alarm}$ and $A_{door}$ effectively.

4. Attacker's constraints: In some implementations, the disclosed method and system estimate critical parameters of an attack based on the attacker's resource limitations, such as available time. For example, attacker's overhead to accomplish $MA_{high}$ within 100 time-units.

TABLE 2

Example estimates for sample security design queries

| Entity | Parameters | Values |
|---|---|---|
| New Attack | ∀Time ≤ 30, $P_a$ ≤ 80%, $P_d$ ≥ 0%, SA = Expert | $P_H$ ≤ 6% |
| New vulnerability | $P_d$ = 0.5, SA = Expert | $P_{PI}$ = 0.52, $P_{BA}$ = 0.03 |
| | $P_d$ = 0.7, SA = Average | $P_{PI}$ = 0.26, $P_{BA}$ = 0.09 |
| | $P_d$ = 0.9, SA = Expert | $P_{PI}$ = 0.038, $P_{BA}$ = 0 |
| New defines mechanism | $P_a$ = 0.5, SA = Expert | $P_{PI}$ = 0.59, $P_{BA}$ = 0.16 |
| | $P_a$ = 0.7, SA = Average | $P_{PI}$ = 0.26, $P_{BA}$ = 0.009 |
| | $P_a$ = 0.9, SA = Novice | $P_{PI}$ = 0.59, $P_{BA}$ = 0.16 |
| Attacker's time constraints | Time = 100, $p_a$ = 0.8, $p_b$ = 0.5, SA-Expert | $P_{PI}$ = 0.52, $Cost_{PI}$ = 144 |
| | Time = 200, $p_a$ = 0.8, $p_d$ = 0.5, SA-Expert | $P_{PI}$ = 0.52, $Cost_{PI}$ = 333 |
| Attacker's cost constraints | Cost = 100, $p_a$ = 0.8, $p_d$ = 0.5, SA-Expert | $P_{PI}$ = 0.52, $Time_{PI}$ = 75 |
| | Cost = 145, $p_a$ = 0.8, $p_d$ = 0.5, SA-Expert | $P_{PI}$ = 0.52, $Time_{PI}$ = 100 |

Example risk, cost, and time estimates from some implementations for the above security design questions are shown in Table 2 above. In some implementations, the disclosed method/system/model can be used to estimate critical parameters for a specific set of input parameters. For example, the probability of a hypothetical attack ($P_H$) can be restricted to less than 6% with minimal defense and an expert SA. In some implementations, specific queries can be generated from the disclosed model/system/method and numerous insights can be obtained from the model. In some implementations, the disclosed model/system/method allows security designers to study complex sets of security metrics, system configurations, and threat vectors, to understand their impact on overall security without implementing any changes to the physical system, i.e., the model can be used to simulate scenarios and attacks.

Example Implementation—Smart Grid

According to the National Institute of Standards and Technology (NIST), a Smart Grid is a system for improving the efficiency, sustainability, economics, and resiliency of a nation's electric grid by developing and demonstrating advances in measurement science to improve grid interoperability and to facilitate use of distribution grid as an enabling platform to provide modern energy services. (See, W. May and P. Pritzker, "NIST framework and roadmap for smart grid interoperability standards, release 3.0," *NIST Special Publication* 1108r3, pp. 1-246, September 2014, which is incorporated herein by reference). Smart Grids are increasingly being used to provide electricity services to consumers. The shift from a conventional electricity grid to a Smart Grid is motivated by the availability of smart monitoring devices and timely communication of system status in Smart Grids. The Smart Grid model is supported by Information and Communications Technology (ICT) and Electrical Power Technology, which together offer an economically efficient and sustainable power system with lower losses and higher levels of quality, security of supply, and safety (See, Wikipedia, "Smart grid," https_://en.wikipedia.org/wiki/Smart grid, which is incorporated herein by reference).

Smart Grids provide benefits to both consumers and service providers. Customers can readily access information about their energy usage, which providers means to monitor and reduce power bills. Service providers can leverage the intelligent monitoring and control infrastructure to improve grid reliability and availability, to predict power outages and take preventive measures, to reduce inefficiencies in power transmission (thereby reducing power generation load) and to integrate unconventional energy generation systems (solar or wind) to boost power generation. These advantages are derived from electrical power and information communications technologies of a Smart Grid. A Smart Grid can be visualized as consisting of two networks—the power network and the communication network, while a conventional grid only has a power network. The communication network, in conjunction with the power network, provides efficient power generation, measurement, monitoring, and control.

The power network can be further sub-divided into a power generation facility, a transmission network, a distribution network, and a consumption network. (See, E. Kabalci and Y. Kabalci, *Introduction to Smart Grid Architecture*. Singapore: Springer Singapore, 2019, pp. 3-45, which is incorporated herein by reference). Each of the sub-systems of the power network has a specific set of components, as shown in FIG. 14.

Figure 14:
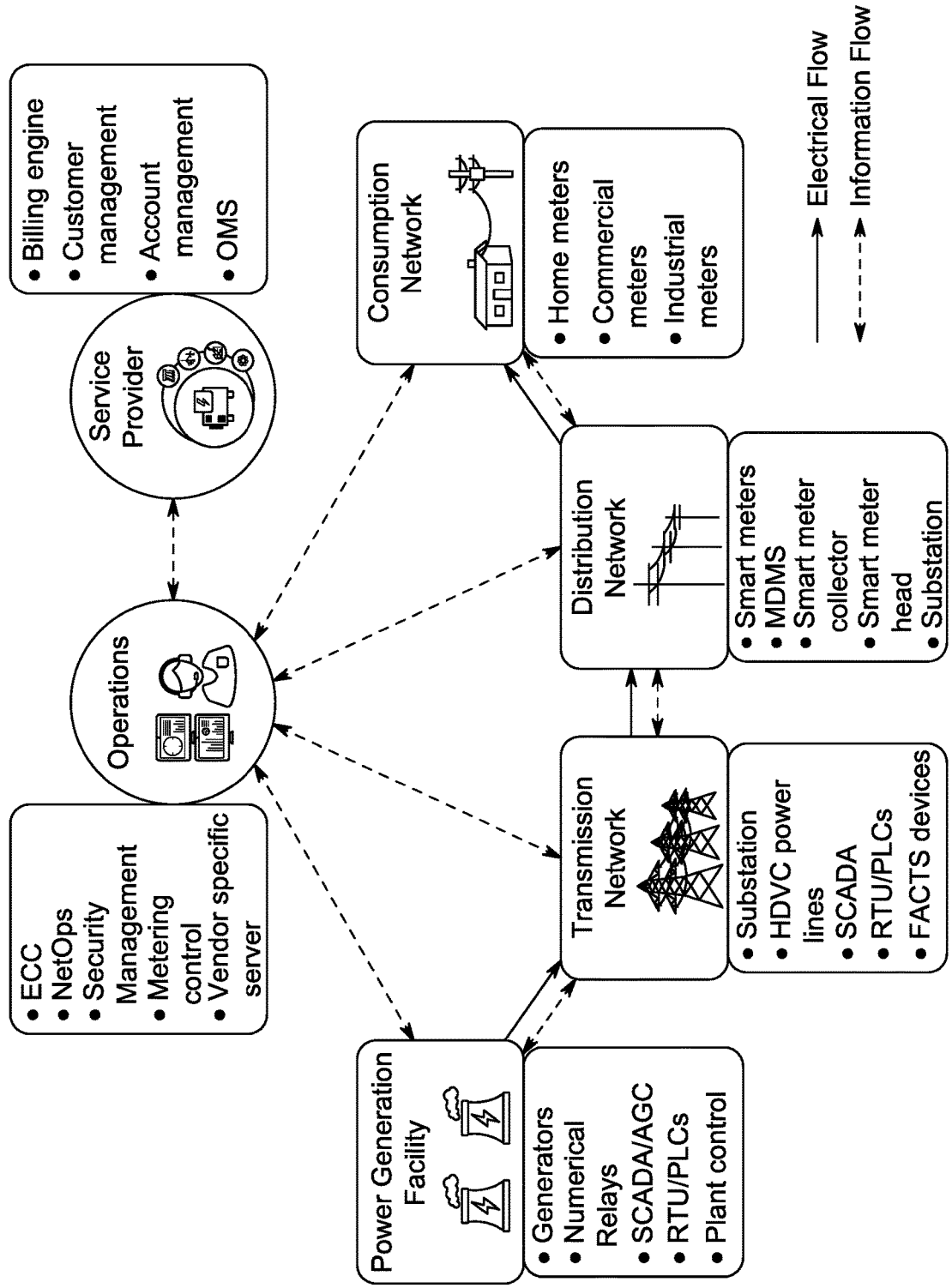
FIG. 14 is a diagram of an exemplary smart grid system architecture in accordance with some implementations.

FIG. 14 is a diagram of an exemplary smart grid system architecture in accordance with some implementations. As shown in FIG. 14, a power network provides a systematic unidirectional flow of power from the power generation facility to the end-user. But the communication network provides a bidirectional flow of information among the various components of the smart grid architecture, including the non-power domains (operations and service providers).

Some of the components of the Smart Grid infrastructure are specific to the power domain (e.g., generators, HVDC power lines, transformers, relays, sub-station units, etc.) but other components belong to either smart devices (e.g., smart meters, smart meter collector, advanced metering infrastructure (AMI), etc.) or to the communication network (HAN, NAN, or WAN communication and networking devices). A Smart Grid leverages smart devices to collect information at various physical locations of the power network and leverages the communication network to transmit and aggregate the monitored data for further processing and decision-making at the operations and service provider sites. For example, a decision may involve increasing power generation in the generation facility (e.g., due to excess demand) or integrating an unconventional energy production system into the Smart Grid (e.g., because of a failure of a sub-component in the conventional power generation facility).

The management of a Smart Grid consists of managing the power network and the communication network. Management of the security of the communication network is a challenge as the information technology (IT) component of the communication network is susceptible/exposed to security threats and attacks. For example, security attacks on the IT infrastructure of Smart Grids have resulted in power outages, leading to significant economic loss and hardships to the end-users. (See, Doug Drinkwater, "Stuxnet-style attack on US smart grid could cost government $1 trillion," www_.scmagazineuk.com/stuxnet-styleattack-us-smart-grid-cost-government-1-trillion/article/1479078; R. M. Lee, M. J. Assante, and T. Conway, *Analysis of the cyber attack on the Ukrainian power grid*. Electricity Information Sharing and Analysis Center (E-ISAC), 2016, pp. 1-29; and The Federal Energy Regulatory Comission (FERC) and the North American Electric Reliability Corporation (NERC), "Arizona-Southern California Outages on Sep. 8, 2011," www_.ferc.gov/legal/staffreports/04-27-2012-ferc-nerc-report.pdf, April 2012, which are incorporated herein by reference).

To address this challenge, organizations (e.g., NIST, IEEE, etc.) and researchers have proposed security frameworks and solutions to model and capture cyber-attack behaviors and recommended defense mechanisms (See, W. May and P. Pritzker, "Guidelines for smart grid cybersecurity," *NISTIR* 7628 *Revision* 1, vol. 1, pp. 1-668, September 2014; and D. K. Anguraj and S. Smys, "Trust-based intrusion detection and clustering approach for wireless body area networks," *Wireless Personal Communications*, vol. 104, no. 1, pp. 1-20, January 2019, which are incorporated herein by reference). Therefore, comprehensive security frameworks are needed to ensure security in Smart Grids.

A unified framework (USaPP) for addressing the security and privacy of smart metering (SM) systems has been proposed and evaluated. (See, G. Kalogridis, M. Sooriyabandara, Z. Fan, and M. A. Mustafa, "Toward unified security and privacy protection for smart meter networks," *IEEE Systems Journal*, vol. 8, no. 2, pp. 641-654, June 2014, which is incorporated herein by reference). The proposed framework is classified into three logical groups, orthogonal domains, and layers, where the logical groups are communications, computing, and system control. The proposed USaPP framework helps address SM network security and privacy issues that arise in different cyber-physical parts of the system. The Smart Grid poses a series of new security challenges that require novel approaches to the field of cybersecurity. (See, Y. Mo, T. H. Kim, K. Brancik, D. Dickinson, H. Lee, A. Perrig, and B. Sinopoli, "Cyberphysical security of a smart grid infrastructure," *Proceedings of the IEEE*, vol. 100, no. 1, pp. 195-209, January 2012, which is incorporated herein by reference). Tight coupling between information and communication technologies and physical systems introduces new security concerns, thereby requiring a rethinking of the commonly used objectives and methods. Information security and system security models are needed to secure cyber-physical systems.

A critical review of cybersecurity threats in complex smart grid infrastructure has been done. (See, R. K. Pandey and M. Misra, "Cyber security threats smart grid infrastructure," in 2016 *National Power Systems Conference (NPSC)*, December 2016, pp. 1-6, which is incorporated herein by reference). The authors analyze confidentiality and privacy issues of components of a smart power system.

A critical evaluation of challenges to smart grid infrastructure and a road map to an immune smart grid infrastructure have been presented. (See, D. Wei, Y. Lu, M. Jafari, P. M. Skare, and K. Rohde, "Protecting smart grid automation systems against cyberattacks," *IEEE Transactions on Smart Grid*, vol. 2, no. 4, pp. 782-795, December 2011, which is incorporated herein by reference). The authors discuss key challenges and corresponding strategies to protect a smart grid against cyber-attacks and propose a conceptual layered framework for protecting power grid automation systems against cyberattacks without compromising timely availability of control and signal data. The proposed approach also provides security protection for legacy systems that do not have enough computational power or memory space to perform security functions.

Cyber-physical attacks on key functional components of a smart grid security system have been studied. (See, Y. Wadhawan, A. Almajali, and C. Neuman, "A comprehensive analysis of smart grid systems against cyber-physical attacks," *Electronics, vol.* 7, October 2018, which is incorporated herein by reference). The authors provide a function-based methodology for evaluating smart grid resilience against cyber-physical attacks and propose a tool (BAGS) to compute the vulnerability likelihood of components of smart grid system. The paper combines the methodology and the tool to provide a risk analysis methodology. Based on the risk analysis, the methodology provides an efficient resource allocation using Reinforcement Learning to compute optimal policies about whether to perform vulnerability assessment or patch a cyber-system of a Smart Grid whose vulnerability has already been discovered. The proposed evaluation can help power engineers to develop robust power systems by improving situational awareness and responses to cyber-physical attacks.

Chen et al. introduce a novel hybrid attack model (See, Y. Chen, T. Gieseking, D. Campbell, V. Mooney, and S. Grijalva, "A hybrid attack model for cyber-physical security assessment in electricity grid," in 2019 *IEEE Texas Power and Energy Conference (TPEC)*, February 2019, pp. 1-6, which is incorporated herein by reference), which combines Probabilistic Learning Attacker model, Dynamic Defender (PLADD) model, and a Markov Chain model to simulate planning and execution stages of a bad data injection attack in a power grid. The main premise of the paper is that the Markov Chain model is not good at modeling scenarios where actions in the preparation stage of an attack take a significantly longer time than the actions in the execution stage. The proposed hybrid model is useful for modeling both long time-to-completion and short timed actions in preparation and execution stages respectively.

Some implementations provide a critical review of existing security modeling frameworks for Smart Grids. Some implementations propose, implement, and analyze a Probabilistic Model Checking (PMC) solution for modeling a Smart Grid security attack process. Some implementations study the effect of various system parameters (e.g., the attack location, the attack probability, the attack consequences) on the robustness of a security risk analysis system (the attack success rate, the attack costs, and the number of attack attempts).

Probabilistic Model Checking

Some implementations include a formal verification approach, called Probabilistic Model Checking (PMC), to model and analyze systems that exhibit probabilistic behavior. In some implementations, PMC does not require running simulations (which can be inaccurate and unrealistic), setting up experimental testbeds (which can be costly and time-consuming) and building mathematical models (which can be complex and computationally intensive).

Some implementations use Markov Decision Process (MDP) to model decisions as the systems being studied may exhibit probabilistic as well as nondeterministic behavior. In some implementations, probabilistic behavior is captured by a probability distribution (e.g., the probability of a Smart Grid component being compromised). In some implementations, non-determinism is used to represent or model an unknown environment (e.g., the attack location chosen by the attacker). In some implementations, once MDP is defined, a reward structure is chosen so as to quantitatively define an end objective, which can be either minimized (e.g., minimize consequences of a compromised component to a Smart Grid) or maximized (e.g., maximize the costs of attacking the Smart Grid) based on the specifications of the system designer.

Some implementations use the PMC tool, PRISM, to model or represent a security attack process (in a Smart Grid) which has both probabilistic and non-deterministic behavioral components (See, M. Kwiatkowska, G. Norman, and D. Parker, "PRISM 4.0: Verification of probabilistic real-time systems," in *Proc.* 23*rd International Conference on Computer Aided Verification (CAV*11), ser. LNCS, G.

Gopalakrishnan and S. Qadeer, Eds., vol. 6806. Springer, (2011), pp. 585-591, which is incorporated herein by reference).

PRISM has been used to model and study systems from diverse domains such as smart cities, robot kinematics, VM migration in cloud computing, wireless sensor networks, and security protocol modeling (See, N. Mohammad, S. Muhammad, A. Bashar, and M. A. Khan, "Formal analysis of human-assisted smart city emergency services," IEEE Access, vol. 7, pp. 60 376-60 388, 2019; S. Muhammad, N. Mohammad, A. Bashar, and M. A. Khan, "Designing human assisted wireless sensor and robot networks using probabilistic model checking," Journal of Intelligent & Robotic Systems, vol. 94, no. 3, pp. 687-709, June 2019; A. Bashar, N. Mohammad, and S. Muhammed, "Modeling and evaluation of pre-copy live vm migration using probabilistic model checking," 2018 12th International Conference on Signal Processing and Communication Systems (ICSPCS), pp. 1-7, 2018; N. Mohammad, S. Muhammad, A. Bashar, and M. A. Khan, "Design and modeling of energy efficient wsn architecture for tactical applications," in 2017 Military Communications and Information Systems Conference (MilCIS), November 2017, pp. 1-6; and Z. Aslanyan, F. Nielson, and D. Parker, "Quantitative verification and synthesis of attack-defence scenarios," in Proc. of Computer Security Foundations Symposium CSF, (2016), each of which are incorporated herein by reference).

Basic building blocks of the PRISM coding language are modules and variables. In some implementations, a system is divided into segments and each segment is modeled or represented as a module. In some implementations, several modules interact with each other to capture the behavior of the system as a whole. In some implementations, a set of commands describe the behavior of each module of the system and rewards can be specified to characterize the performance of the system. Some implementations use PRISM for the analysis of MDP, which captures the behavior of an attacker of the Smart Grid system. Since the Smart Grid consists of various physical components (in different domains) that can be compromised, dependencies among these components are studied in some implementations. In some implementations, these dependencies among the various components are decided by physical and logical connections among them. Details of these dependencies have been published. (See, Y. Wadhawan, A. Almajali, and C. Neuman, "A comprehensive analysis of smart grid systems against cyber-physical attacks," Electronics, vol. 7, October 2018, which is incorporated herein by reference).

Some implementations build the MDP based on the dependencies among components of the system. In some implementations, the MDP is built for a specific scenario. In some implementations, the MDP is built for generic scenarios and the MDP can be encoded in the language of PRISM and analyzed for various parameters. In some implementations, LTL is used to write the required specifications. In some implementations, PRISM can perform two specific functions. First, PRISM can check if the modeled system satisfies the required specifications based on a pre-specified strategy. Second, PRISM can help synthesize a strategy that will meet the specifications proposed by the system modeler.

Smart Grid Security Attack Model

In some implementations, the smart grid security attack method and system are based on the test smart grid network envisioned. (See, Y. Wadhawan, A. Almajali, and C. Neuman, "A comprehensive analysis of smart grid systems against cyber-physical attacks," Electronics, vol. 7, October 2018, which is incorporated herein by reference). Although the smart grid architecture illustrated in FIG. 14 shows four sub-networks in the power network (i.e., Generation, Transmission, Distribution, and Consumption) and two non-power networks (i.e., Operations and Service Providers), some implementations build the model for Distribution, Operations, and Service Provider networks only. A reason for this selection is that most of the security attacks in the past have been observed to have primarily impacted these three networks. (See, R. K. Pandey and M. Misra, "Cyber security threats smart grid infrastructure," in 2016 National Power Systems Conference (NPSC), December 2016, pp. 1-6, which is incorporated herein by reference).

In some implementations, components of the power and non-power networks which are more likely to be subject to security attacks are identified. These components are listed in Table 3 along with their abbreviated forms. In some implementations, the components of the Distribution network that are more likely to be attacked are Smart Meters (SM), Smart Meter Collector (SMC), Smart Meter Head Server (SMHS), and Meter Data Management (MDM). In some implementations, the components of the Operations network that are more likely to be attacked are Vendor Specific Server (VSS) and Electricity Control Center (ECC). In some implementations, the components of the Service Provider network that are more likely to be attacked are Billing Engine (BE) and Outage Management System (OMS).

TABLE 3

Smart Grid Components, Probability of Compromise, and Consequences

| Smart Grid Component | PoC | Consequence |
|---|---|---|
| Smart Meter (SM) | $P_{SM} = 0.59$ | Minor |
| Smart Meter Collector (SMC) | $P_{SMC} = 0.66$ | Minor |
| Smart Meter Head Server (SMHS) | $P_{SMHS} = 0.50$ | Insignificant |
| Billing Engine (BE) | $P_{BE} = 0.36$ | Insignificant |
| Vendor Specific Server (VSS) | $P_{VSS} = 0.65$ | Insignificant |
| Meter Data Management (MDM) | $P_{MDM} = 0.48$ | Minor |
| Outage Management System (OMS) | $P_{OMS} = 0.15$ | Major |
| Electricity Control Center (ECC) | $P_{ECC} = 0.12$ | Major |

Table 3 also provides the Probability of Compromise (PoC) for each of the Smart Grid components. For example, in some implementations, the most vulnerable component that can be successfully attacked by the attacker with a PoC=0.66 is the SMC and the most secured component, with a PoC=0.12, is the ECC. In some implementations, these probabilities are computed using the Common Vulnerability Scoring System (CVSS). (See, CVSS Special Interest Group, "Common Vulnerability Scoring System," www_.first.org/cvss/, which is incorporated herein by reference). As a high PoC is a measure of the ease of successfully attacking a specific component, in some implementations, the cost to the attacker of compromising the SMC will be lowest and the cost to the attacker of compromising the ECC will be the highest. Table 3 also provides the consequences (e.g., economical losses, service unavailability, or inconvenience to the consumers) of a specific component being compromised in some implementations. In some implementations, there are three levels for consequences, namely, Insignificant, Minor, and Major. This classification is based on the importance of each component to the Smart Grid. For example, the compromise of OMS and ECC may result in major consequences as these centralized components aggregate data from distributed components. If an attacker gains access to either of these components, critical data can be compromised.

Figure 15:
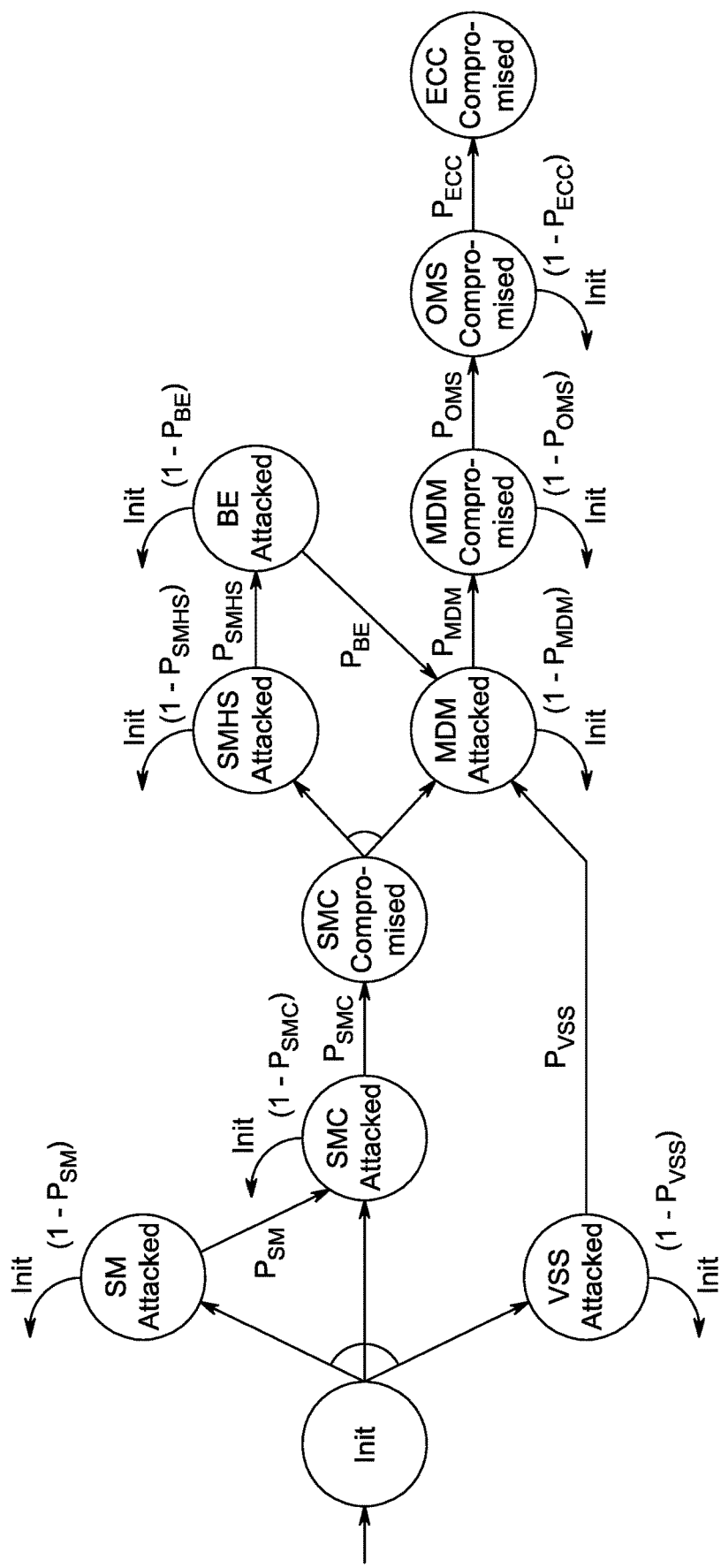
FIG. 15 shows an example MDP of an example attack model in accordance with some implementations.

In some implementations, based on the information collected regarding the various components of the Smart Grid in Table 3, the MDP of the attack model is designed. FIG. 15 shows an exemplary MDP of an example attack model in the Smart Grid in accordance with some implementations. As shown in FIG. 15, in some implementations, the attacker starts from the initial state termed as Init. In some implementations, at this stage, the attacker has a choice of "non-deterministically" attacking one of the three components, SM, SMC, or VSS. These states are labeled as SMAttacked, SMC Attacked, and VSS Attacked, respectively. In some implementations, when a component is compromised with a probability of PoC, the attacker moves to the next state, and if a component is not compromised with a probability of (1−PoC), the attacker returns to the initial state Init. For example, the attacker successfully moves to the SMC Attacked state after compromising the SMC with a probability of PSM, and with a probability of (1−PSIM), the attacker is unsuccessful and returns to the Init state.

In some implementations, at the SMC Compromised state, the attacker has to non-deterministically choose between attacking the SMHS or the MDM components with the goal of moving to the SMHS Attacked or the MDM Attacked states, respectively. The attacker keeps on proceeding in this fashion, in some implementations, until they reach the final state ECC Compromised. In some implementations, ECC is a key component of the Smart Grid system, and once the attacker successfully attacks the ECC, the MDP is completed. There is a subtle difference between attacking a component and the component being compromised. An attack may be successful or unsuccessful, and only a successful attack is said to compromise a component. Also, in order to successfully compromise the last component in a chain, all of the preceding components that are serially connected in the chain have to be compromised.

In some implementations, the MDP, which captures the behavior of the attacker and the intended compromise of components of the Smart Grid, is used to analyze the system under consideration. In some implementations, only parameters related to the risk analysis of the Smart Grid system are considered. In some implementations, the probability of attacking various Smart Grid components successfully was first determined. In some implementations, three important components, namely, the SMC, the MDM, and the ECC were selected based on the data presented in Table 3. In some implementations, this parameter selection is critical from the Smart Grid security manager's perspective as the selection determines the means to secure the overall system by taking into account cumulative PoCs of the various components.

The second step involves determining costs of each attack to the attacker for compromising a particular Smart Grid component. The attack cost information allows the security manager to determine the time required for an attacker of a certain skill to compromise a component. The third step involves studying the effect of the number of attack attempts on the probability of a successful attack and the attack costs involved therein. In some implementations, these different scenarios are captured by the Temporal Logic formulas shown in Table 4. These formulas provide results in two categories, i.e., probabilities (Eq. 1 and Eq. 3 for maximum probabilities Pmax) and rewards (Eq. 2 for AttackCost and Eq. 4 for NumAttempts).

TABLE 4

Sample LTL Formulas

| | |
|---|---|
| $\phi_1 \equiv P_{max} = ?[F((attackSuccess) \& (stop))]$ | (1) |
| $\phi_2 \equiv R\{Attack\_Cost\}min = ?[C <= Time]$ | (2) |
| $\phi_3 \equiv P_{max} = ?[true \ U <= Time \ attackSuccess \& (stop)]$ | (3) |
| $\phi_4 \equiv R\{Num\_attempts\}max = ?[C <= Time]$ | (4) |

The results from some implementations based on this model are presented below, where specific values of the various parameters used in the study are described.

Results

The Smart Grid attack model is implemented in the PRISM model checker. This model is used in some implementations for risk analysis of the Smart Grid system. Only attacks on SMC, MDM, and ECC components are considered in some implementations. The parameters used in this analysis are summarized in Table 5.

TABLE 5

Parameter values

| Parameter | Value |
|---|---|
| Attack type | $SMC_{comp}$, $MDM_{comp}$, $ECC_{comp}$ |
| Single attack cost | 1 unit |
| Number of attempts | 1, 3, 5 |
| Probability of attack success | [0, 1] |
| Time (epochs) | 0-30 |

Figure 16:
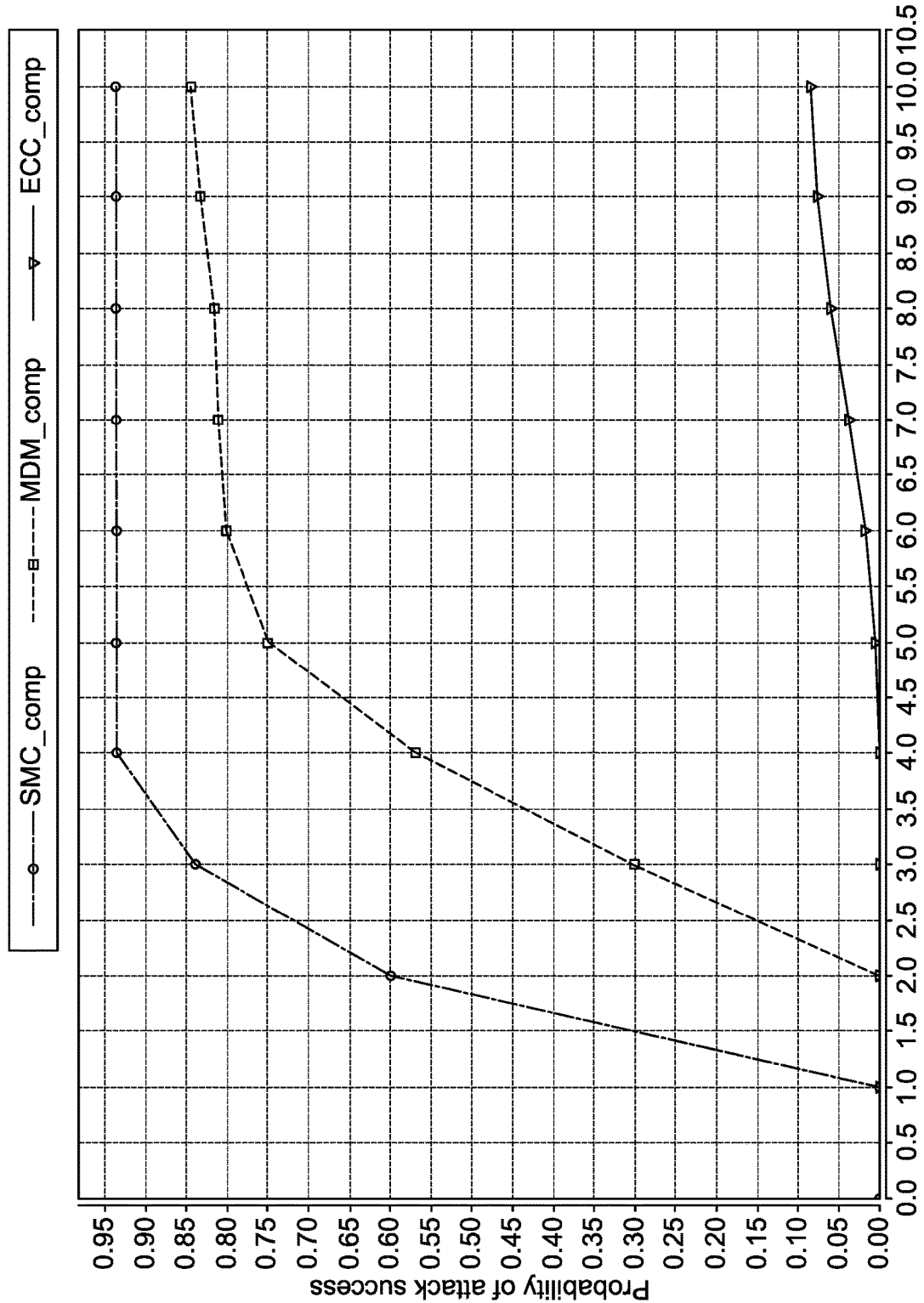
FIG. 16 is a graph showing example probability of a successful attack for different types of attacks in accordance with some implementations.
Figure 17:
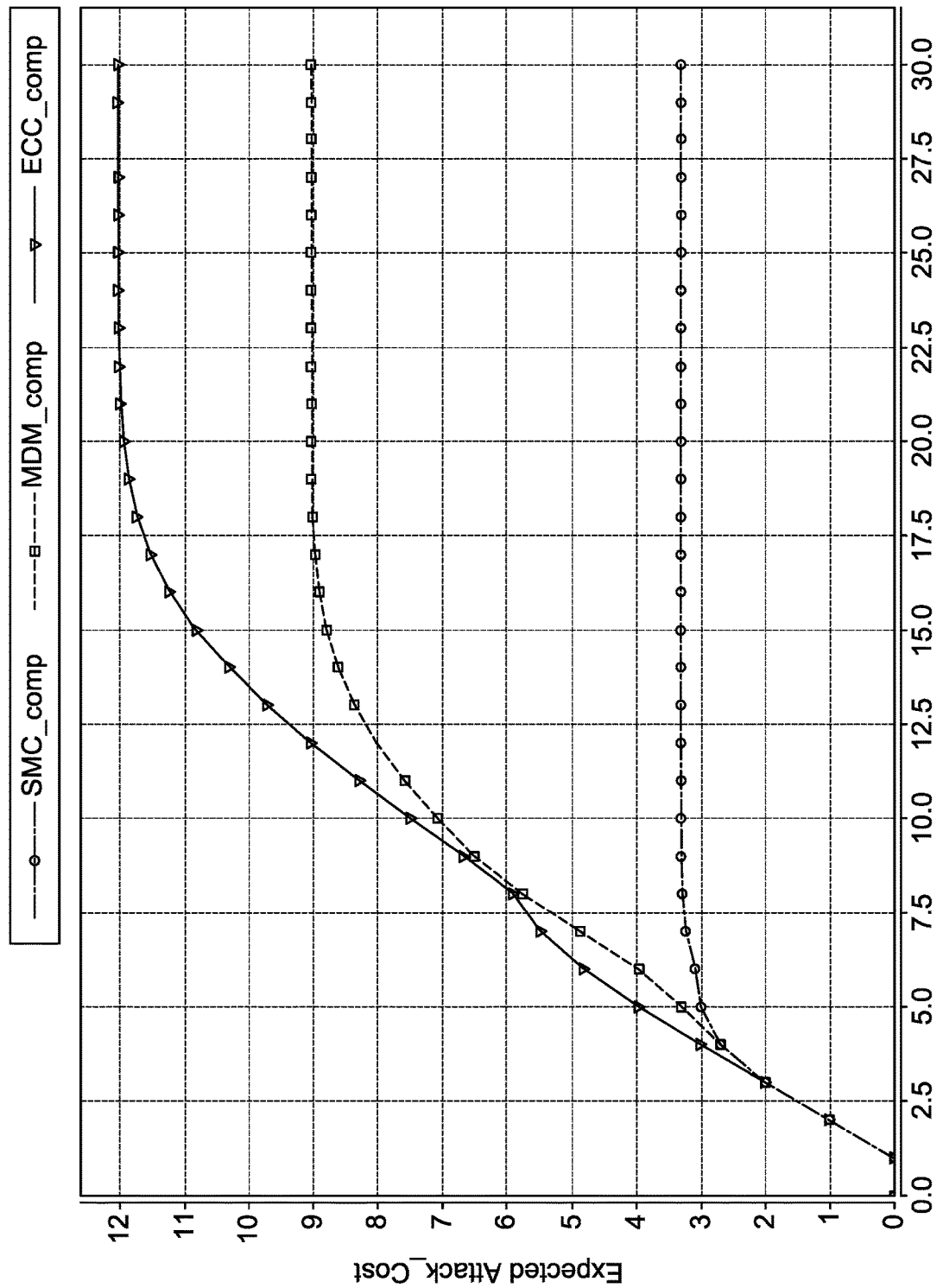
FIG. 17 is a graph showing example attack costs for different types of attacks in accordance with some implementations.

FIG. 16 is an example graph showing the probability of a successful attack for different Smart Grid attacks in accordance with some implementations. For example, FIG. 16 shows the maximum probability of compromise of SMC, MDM, and ECC, over time. FIG. 16. shows that compromising ECC is very difficult and that the probability of success is less than 10%. This is because ECC can be attacked only after successfully compromising MDM. For this reason, the probability of compromise of ECC is nearly zero until the probability of compromise of MDM increases to 75%. However, SMC is more susceptible to attacks as it is more easily accessible to end users. The Smart Grid security team can add more defense mechanisms to thwart attacks on SMC to help minimize the attacks on MDM, thus contributing to safety of the Smart Grid. FIG. 17 is an example graph showing the attack costs for different Smart Grid attacks in accordance with some implementations. For example, FIG. 17 shows the cost of a successful attack that is required to compromise SMC, MDM, and ECC.

Figure 18:
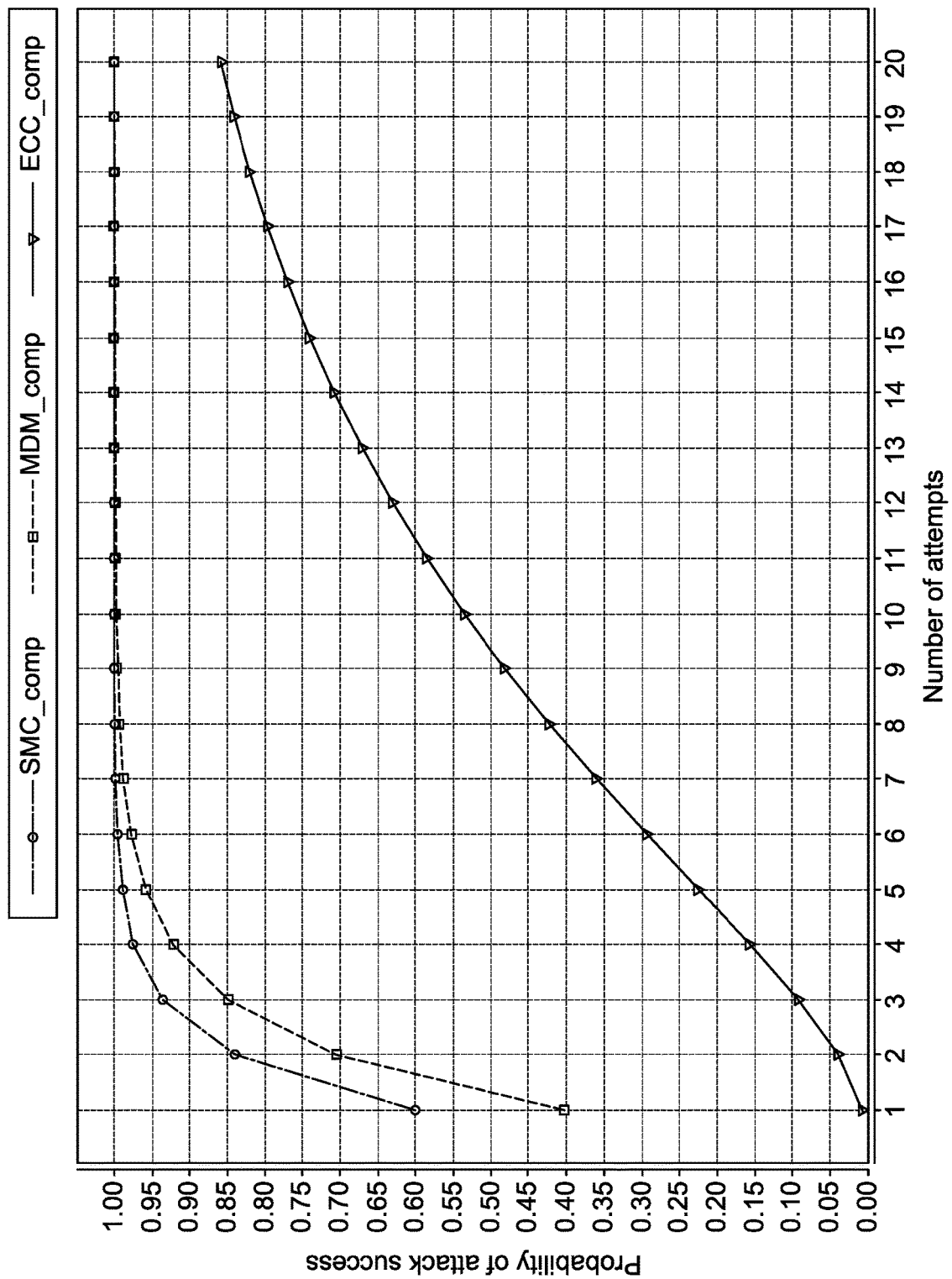
FIG. 18 is a graph showing example probability of a successful attack for attacks involving multiple attempts in accordance with some implementations.

The greater the difficulty of compromising a Smart Grid component, the higher is the attack cost. Thus, the attack cost is low for compromising SMC and very high for compromising ECC. FIGS. 16 and 17 are based on the assumption that the average number of attempts the attacker can perform to compromise the Smart Grid components is three. The probability of success when this condition is relaxed and the attacker can try multiple times to compromise the Smart Grid components is calculated. FIG. 18 is an example graph showing the probability of a successful attack for Smart Grid attacks involving multiple attempts in accordance with some implementations. For example, FIG. 18 shows the probability of compromise for three Smart Grid attack types by varying the number of attempts. FIG. 18 shows that the probability of success increases when the attacker can perform multiple attack attempts. In some implementations, SMC and MDM can be compromised when the number of attack attempts are six and ten respectively. Similarly, the probability of ECC compromise increases to more than 50% when the number of attack attempts is ten. However, the attack cost also increases with the number of attempts.

Figure 19:
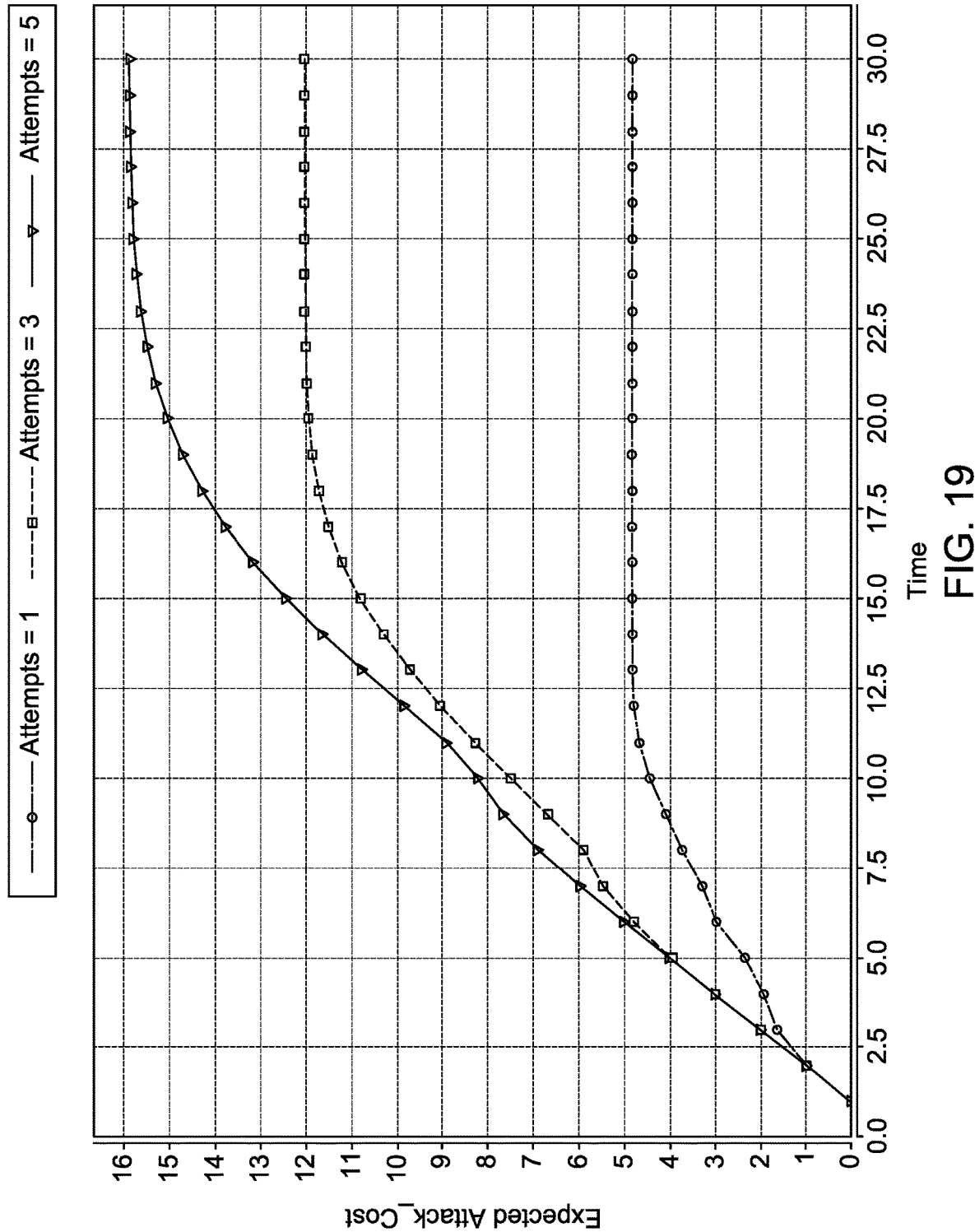
FIG. 19 is a graph showing example attack costs for attacks involving multiple attempts in accordance with some implementations.

FIG. 19 is an example graph showing attack costs for ECC attacks involving multiple attempts in accordance with some implementations. FIG. 19 shows that attack cost increases by more than three times when the number of attempts is changed from one to three. The results thus show that advanced persistent attacks are a big threat to Smart Grids. However, such attacks can be managed with the proper design of a multi-layered defense mechanism (See, N. Mohammad, "A multi-tiered defense model for the security analysis of critical facilities," *IEEE Access*, 2019, which is incorporated herein by reference), as shown in some of the implementations of the disclosed method/system in this description.

Some implementations include a security attack method and system for risk assessment of a Smart Grid system in order to protect Smart Grids in the event/face of a security attack. In some implementations, a Probabilistic Model Checking (PMC) approach is used to design the MDP model, which incorporated eight critical components of the Smart Grid system, with a particular focus on SMC, MDM, and ECC. In some implementations, scenarios based on persistent and non-persistent behavior of an attacker were modeled. The probability of compromising ECC, SMC, and MDM increases with the increase in the number of attack attempts in some implementations. However, for SMC and MDM, the increase is faster (in only 7 attempts, the probability of compromise reached 100%) as compared to for ECC (in 7 attempts, the probability of compromise reached only 35%). Also, the attack costs increase by about 140% in the case of ECC compromise when the number of attempts increase from 1 to 3. ECC had the lowest probability of compromise, compared to SMC and MDM. The attack costs for ECC are higher as well.

The above results provide guidelines and insights to security managers to determine security loopholes in a system and take proactive measures to fix them promptly. The effects of other system parameters on security risk assessment are studied (e.g., scalability study of the model by increasing the number of Smart Grid components). An automated defense mechanism is incorporated in the model. In some implementations, updated PoC from CVSS are included in the model.

In general, a computer that performs the processes described herein can include one or more processors and a memory (e.g., a non-transitory computer readable medium). The process data and instructions may be stored in the memory. These processes and instructions may also be stored on a storage medium, such as a hard drive (HDD) or portable storage medium or may be stored remotely. Note that each of the functions of the described embodiments may be implemented by one or more processors or processing circuits. A processing circuit can include a programmed processor, as a processor includes circuitry. A processing circuit/circuitry may also include devices such as an application specific integrated circuit (ASIC) and conventional circuit components arranged to perform the recited functions. The processing circuitry can be referred to interchangeably as circuitry throughout the disclosure. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk, or any other information processing device.

The processor may contain one or more processors and may even be implemented using one or more heterogeneous processor systems. According to certain implementations, the instruction set architecture of the processor can use a reduced instruction set architecture, a complex instruction set architecture, a vector processor architecture, or a very large instruction word architecture. Furthermore, the processor can be based on the Von Neumann model or the Harvard model. The processor can be a digital signal processor, an FPGA, an ASIC, a PLA, a PLD, or a CPLD. Further, the processor can be an x86 processor by Intel or AMD, an ARM processor, a Power architecture processor by, e.g., IBM, a SPARC architecture processor by Sun Microsystems or Oracle, or other known CPU architecture.

The functions and features described herein may also be executed by various distributed components of a system. For example, one or more processors may execute the functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or a WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced and/or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that may be claimed.

What is claimed is:

1. A system to provide computer security analysis, the system comprising:
    one or more processors coupled to a non-transitory computer readable storage having
    software instructions stored thereon configured to cause the one or more processors to:
    perform a Markov Decision Process (MDP) as part of a cyber-attack mechanism and a Discrete Time Markov Chain (DTMC) process as part of a cyber-defense mechanism;
    synchronize the cyber-attack mechanism with the cyber-defense mechanism through an attack-defense synchronization action; and synchronize an update action, wherein the attack-defense synchronization action includes initiating the DTMC process, and wherein the synchronization of the update action results from one or more actions taken by the DTMC process, wherein the Markov Decision Process (MDP) for the cyber-attack mechanism comprises:

in a first state, selecting, non-deterministically, a particular type of attack;

in a second state, selecting a component device;

in a third state, determining one of the component devices being successfully attacked by the particular type of attack with a probability $p^{ij}$ or the cyber-defense mechanism thwarting the particular type of attack with a probability $(1-p^{ij})$; and when the component device is successfully attacked, raising a security alert.

2. The system of claim 1, wherein, when a third tier of defense fails to protect the component device, changing a status of the component device to compromised.

3. The system of claim 1, wherein the DTMC process probabilistically raises a defense level of the system in response to one or more of a workload level reaching a workload threshold or a fatigue level reaching a fatigue threshold.

4. A method to provide computer security analysis, the method comprising:

performing, using one or more processors, a Markov Decision Process (MDP) as part of a cyber-attack and defense mechanism and a Discrete Time Markov Chain (DTMC) process as part of a security analyst (SA) cyber-defense mechanism;

synchronizing an update action using the one or more processors, wherein the attack-defense synchronization action includes initiating the DTMC process, and wherein the synchronization of the update action results from one or more actions taken by the DTMC process, wherein the Markov Decision Process (MDP) for the cyber-attack mechanism comprises:

in a first state, selecting, non-deterministically, a particular type of attack;

in a second state, selecting a component device;

in a third state, determining one of the component devices being successfully attacked by the particular type of attack with a probability $p^{ij}$ or the cyber-defense mechanism thwarting the particular type of attack with a probability $(1-p^{ij})$; and when the component device is successfully attacked, raising a security alert.

5. The method of claim 4, wherein, when a third tier of defense fails to protect the component device, changing a status of the component device to compromised.

6. The method of claim 4, wherein the DTMC process probabilistically raises a defense level of a system in response to one or more of a workload level reaching a workload threshold or a fatigue level reaching a fatigue threshold.

7. The method of claim 4, further comprising:

identifying, using the one or more processors, components and relationships among components in a cyber physical system operating under a control of a security operations center; and identifying, using the one or more processors, vulnerabilities of one or more of each of the components or each of one or more communication protocols of the cyber physical system.

8. The method of claim 4, further comprising:

operating, through a probabilistic model, using the one or more processors, the MDP for a selected attack model in parallel with the DTMC process for a selected defense model, wherein the probabilistic model predicts one or more of a probability of occurrence a security attack, a cost of the security attack, or a time of occurrence of the security attack, wherein the selected attack model is selected from one or more attack models including one or more of a denial of service (DoS) attack model, an eavesdropping (Man in the Middle) attack model, a replay attack model, a data modification attack model, a masquerade attack model, or a blind attack model, wherein the selected defense model is selected from one or more defense models including one or more of a firewall defense model, an intrusion detection system (IDS) defense model, a proxy defense model, an analyst model, or an anti-malware defense model.

9. The method of claim 8, wherein the one or more defense models include at least a first defense model at a component level, a second defense model at a system level, and a third defense model at a security operation center level.

10. A non-transitory computer readable medium having instructions stored therein that, when executed by one or more processors, cause the one or more processors to perform a method to provide computer security analysis, the method comprising:

performing, using the one or more processors, a Markov Decision Process (MDP) as part of a cyber-attack mechanism and a Discrete Time Markov Chain (DTMC) process as part of a cyber-defense mechanism;

synchronizing, using the one or more processors, the cyber-attack mechanism with the cyber-defense mechanism through an attack-defense synchronization action; and synchronizing an update action, using the one or more processors, wherein the attack-defense synchronization action includes initiating the DTMC process, and wherein the synchronization of the update action results from one or more actions taken by the DTMC process, wherein the Markov Decision Process (MDP) for the cyber-attack mechanism comprises:

in a first state, selecting, non-deterministically, a particular type of attack;

in a second state, selecting a component device;

in a third state, determining one of the component devices being successfully attacked by the particular type of attack with a probability $p^{ij}$ or the cyber-defense mechanism thwarting the particular type of attack with a probability $(1-p^{ij})$; and when the component device is successfully attacked, raising a security alert.

11. The non-transitory computer readable medium of claim 10, wherein, when a third tier of defense fails to protect the component device, changing a status of the component device to compromised.

12. The non-transitory computer readable medium of claim 10, further comprising:

identifying, using the one or more processors, components and relationships among components in a cyber physical system operating under a control of a security operations center; and identifying, using the one or more processors, vulnerabilities of one or more of each of the components or each of one or more communication protocols of the cyber physical system.

13. The non-transitory computer readable medium of claim 10, further comprising:
operating, through a probabilistic model, using the one or more processors, the MDP for a selected attack model in parallel with the DTMC process for a selected defense model, wherein the probabilistic model predicts one or more of a probability of occurrence a security attack, a cost of the security attack, or a time of occurrence of the security attack.

14. The non-transitory computer readable medium of claim 10, wherein the DTMC process probabilistically raises a defense level of a system in response to one or more of a workload level reaching a workload threshold or a fatigue level reaching a fatigue threshold.

* * * * *